US012798680B2

(12) United States Patent
Kawamura et al.

(10) Patent No.: US 12,798,680 B2
(45) Date of Patent: Nov. 17, 2026

(54) VEHICLE FRAME WITH MAIN BODY MEMBER AND REINFORCING MEMBER JOINED BY ADHESIVE LAYER

(71) Applicant: MAZDA MOTOR CORPORATION, Hiroshima (JP)

(72) Inventors: Chikara Kawamura, Aki-gun (JP); Kenichi Yamamoto, Aki-gun (JP); Masanori Honda, Aki-gun (JP); Toshiyuki Gendo, Aki-gun (JP); Tetsuya Sugiyama, Tokyo (JP); Masaki Shimada, Tokyo (JP); Masumi Hasegawa, Tokyo (JP); Koichi Hamada, Tokyo (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 291 days.

(21) Appl. No.: 18/641,816

(22) Filed: Apr. 22, 2024

(65) Prior Publication Data

US 2024/0375717 A1 Nov. 14, 2024

(30) Foreign Application Priority Data

May 11, 2023 (JP) ................................ 2023-078567

(51) Int. Cl.

*B62D 25/04* (2006.01)
*B62D 21/15* (2006.01)
*B62D 29/00* (2006.01)

(52) U.S. Cl.

CPC ........... *B62D 25/04* (2013.01); *B62D 21/157* (2013.01); *B62D 29/005* (2013.01); *B32B 2605/08* (2013.01)

(58) Field of Classification Search

CPC .............................. B62D 29/005; B62D 25/04
See application file for complete search history.

(56) References Cited

U.S. PATENT DOCUMENTS

| | | | | |
|---|---|---|---|---|
| 7,510,234 B2 * | 3/2009 | Ameloot | B62D 25/04 | 296/203.03 |
| 2011/0127802 A1 * | 6/2011 | Kim | B62D 25/04 | 296/203.03 |
| 2012/0043019 A1 * | 2/2012 | Belpaire | B62D 29/002 | 428/131 |
| 2015/0197289 A1 * | 7/2015 | Kurokawa | B62D 29/004 | 296/187.08 |

(Continued)

FOREIGN PATENT DOCUMENTS

| | | | |
|---|---|---|---|
| JP | 2005-001615 A | | 1/2005 |
| JP | 2010036696 A | * | 2/2010 |

*Primary Examiner* — Robert E Fuller
(74) *Attorney, Agent, or Firm* — Studebaker Brackett PLLC

(57) ABSTRACT

A vehicle frame includes an elongated main body member, a reinforcing member along the main body member, and an adhesive layer that joins the main body member and the reinforcing member. The main body member includes a main body first wall portion and two main body side wall portions. The reinforcing member includes a reinforcing first wall portion and two reinforcing side wall portions. The adhesive layer is formed such that a thickness between the main body side wall portion and the reinforcing side wall portion at a reinforcing side end portion is larger than a thickness between the main body first wall portion and the reinforcing first wall portion.

13 Claims, 14 Drawing Sheets

(56) References Cited

U.S. PATENT DOCUMENTS

| | | | | |
|---|---|---|---|---|
| 2016/0257348 | A1* | 9/2016 | Balur | B62D 25/02 |
| 2017/0036701 | A1* | 2/2017 | Yamada | B62D 29/002 |
| 2019/0039658 | A1* | 2/2019 | Yokoi | B62D 29/002 |

* cited by examiner

VEHICLE FRAME WITH MAIN BODY MEMBER AND REINFORCING MEMBER JOINED BY ADHESIVE LAYER

FIELD OF INVENTION

The present invention relates to a vehicle frame structure.

BACKGROUND ART

In a vehicle such as an automobile, a frame formed by overlapping and joining different kinds of materials may be used. JP 2005-1615 A discloses a frame structure including an outer panel having a hat-shaped cross-sectional shape and a reinforcement disposed along an inner surface of the outer panel, the outer panel and the reinforcement being joined to each other by a plurality of rivets.

In the frame structure disclosed in JP 2005-1615 A, the outer panel is made of a metal material such as a steel plate, and the reinforcement is made of an FRP material such as a carbon fiber-reinforced resin.

Research and development have also been made to join members made of different materials using an adhesive instead of joining with a rivet as disclosed in JP 2005-1615 A. By joining members using an adhesive in this manner, a joining region between the members can be not local as in the technique disclosed in JP 2005-1615 A but widened to the entire region. In addition, by adopting a configuration in which members are joined to each other with an adhesive, it is also possible to avoid complicated work in manufacture of a frame.

However, for a frame in which different kinds of members are joined to each other with an adhesive, it is required to further improve a bending strength without sacrificing weight reduction of the frame. Specifically, in a frame including a member having a hat-shaped cross-sectional shape as disclosed in the above-described JP 2005-1615 A, in which members are joined to each other with an adhesive, a compressive load may be input to a top plane facing an inner panel from a direction orthogonal to the top plane. In such a case, a shearing force acts between the members on the top plane, and a peeling force acts between the members on a vertical wall portion. Here, while it is effective to reduce a thickness of an adhesive layer in order to resist the shearing force, it is effective to increase the thickness of the adhesive layer in order to resist the peeling force. As described above, a countermeasure against the shearing force acting on the top plane and a countermeasure against the peeling force acting on the vertical wall portion are contradictory.

Here, although it is conceivable to increase a thickness of at least one member forming the frame in order to resist the shearing force and the peeling force as described above, this hinders weight reduction of the frame and cannot be adopted.

In addition, a frame formed by joining different kinds of members using an adhesive has a concern that crevice corrosion occurs at an end edge of the member in a cross section. Crevice corrosion is caused by adhesion of moisture to an end edge of a member, and is required to be suppressed from the viewpoint of quality maintenance in a frame constituting a vehicle.

SUMMARY OF THE INVENTION

The present invention has been made to solve the above problems, and an object of the present invention is to provide a vehicle frame structure enabling strength and rigidity to be improved without hindering weight reduction and occurrence of crevice corrosion to be suppressed.

A vehicle frame structure according to an aspect of the present invention includes a main body member, a reinforcing member, and an adhesive layer. The main body member is an elongated member. The reinforcing member is an elongated member extending along the main body member in a first direction in which the main body member extends, and is made of a material different from the main body member. The adhesive layer is a layer made of an adhesive that joins the main body member and the reinforcing member to each other.

In the vehicle frame structure according to the present aspect, in a cross section orthogonal to the first direction, the main body member includes a main body first wall portion extending in a second direction that is one direction included in the cross section, and two main body side wall portions that are continuous with the main body first wall portion at opposite ends of the main body first wall portion, respectively, and extend in a direction intersecting the second direction.

In addition, in the vehicle frame structure according to the present aspect, in the cross section, the reinforcing member includes a reinforcing first wall portion extending in the second direction along the main body first wall portion, and two reinforcing side wall portions that are continuous with the reinforcing first wall portion at opposite ends of the reinforcing first wall portion, respectively, and extend in the direction intersecting the second direction along the main body side wall portions.

Furthermore, in the vehicle frame structure according to the present aspect, the main body first wall portion is a wall portion to which a compressive load is input in a direction intersecting both the first direction and the second direction, and the reinforcing member includes a reinforcing side end portion that is an end edge on a side opposite to a continuous part with the reinforcing first wall portion in each of the two reinforcing side wall portions. Then, the adhesive layer is formed such that a thickness between the main body side wall portion and the reinforcing side wall portion at the reinforcing side end portion is larger than a thickness between the main body first wall portion and the reinforcing first wall portion.

DETAILED DESCRIPTION

In the following, embodiments will be described with reference to the drawings. Modes to be described below are examples of the present invention, and the present invention is not limited to the following modes except for their essential configurations.

First Embodiment

1. Configuration of Vehicle 100

Figure 1:
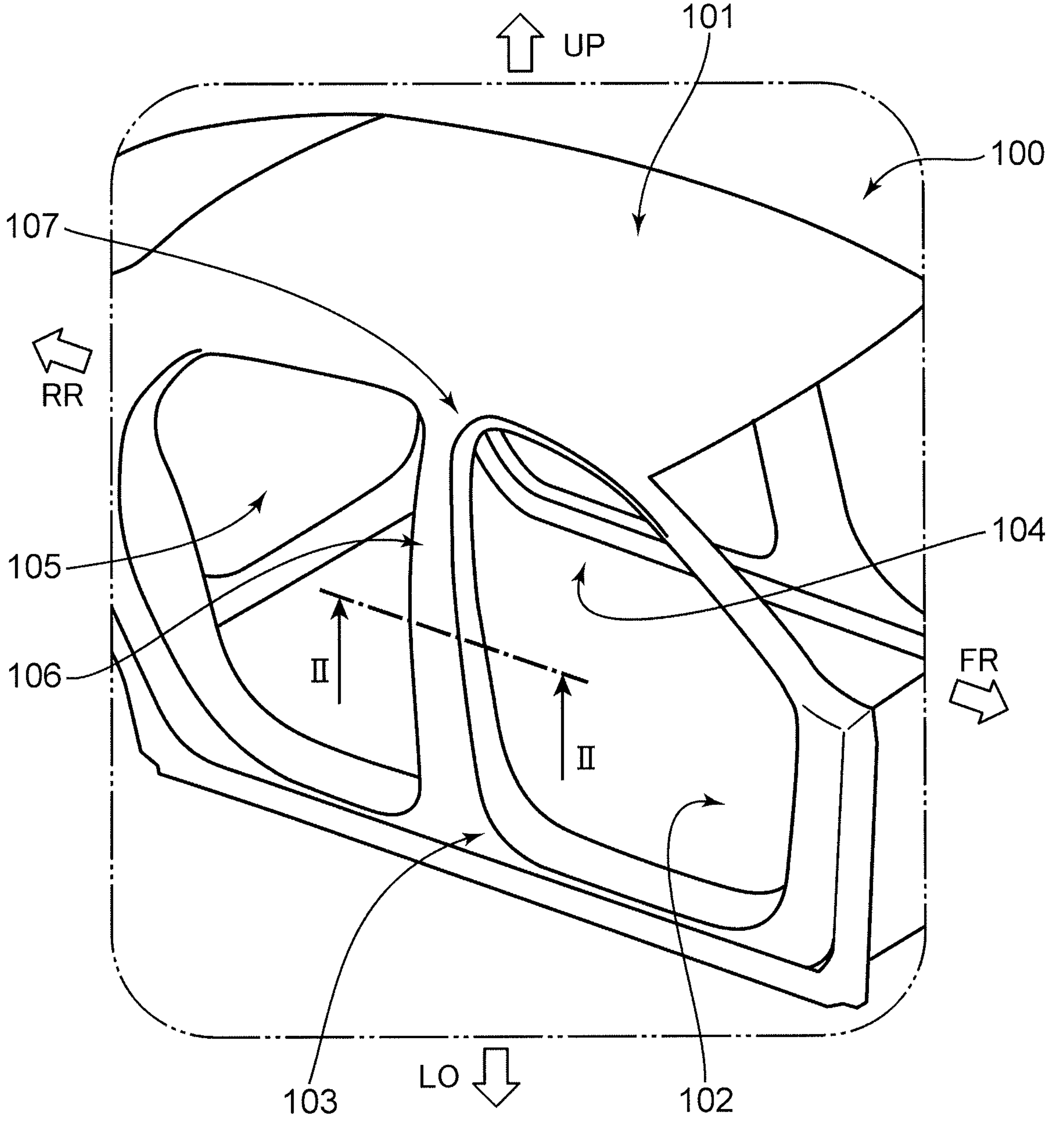
FIG. 1 is a perspective view showing a part of a vehicle to which a frame structure according to a first embodiment is applied.

A vehicle 100 to which a frame structure according to a first embodiment is applied will be described with reference to FIG. 1. In FIG. 1, the front of the vehicle 100 is indicated by "FR", the rear is indicated by "RR", the upper is indicated by "UP", and the lower is indicated by "LO".

As shown in FIG. 1, the vehicle 100 includes a roof panel 101 disposed so as to cover an upper side of a vehicle cabin. Roof side rails 107 extending in a vehicle front-rear direction are disposed on opposite sides of the roof panel 101. A space between the roof panel 101 and a floor panel 102 is a vehicle cabin.

Openings 104 and 105 through which a passenger enters and exits the vehicle are provided below the roof side rails 107. Side sills 103 extending in the vehicle front-rear direction are provided below the openings 104 and 105 and on opposite sides of the floor panel 102. A center pillar 106 extending in an up-down direction between the roof side rail 107 and the side sill 103 is provided between the opening 104 and the entry and exit opening 105. When being collided against the vehicle 100 from the side, the center pillar 106 receives an input of a compressive load from an outer surface.

2. Cross-Sectional Structure of Center Pillar 106

Figure 2:
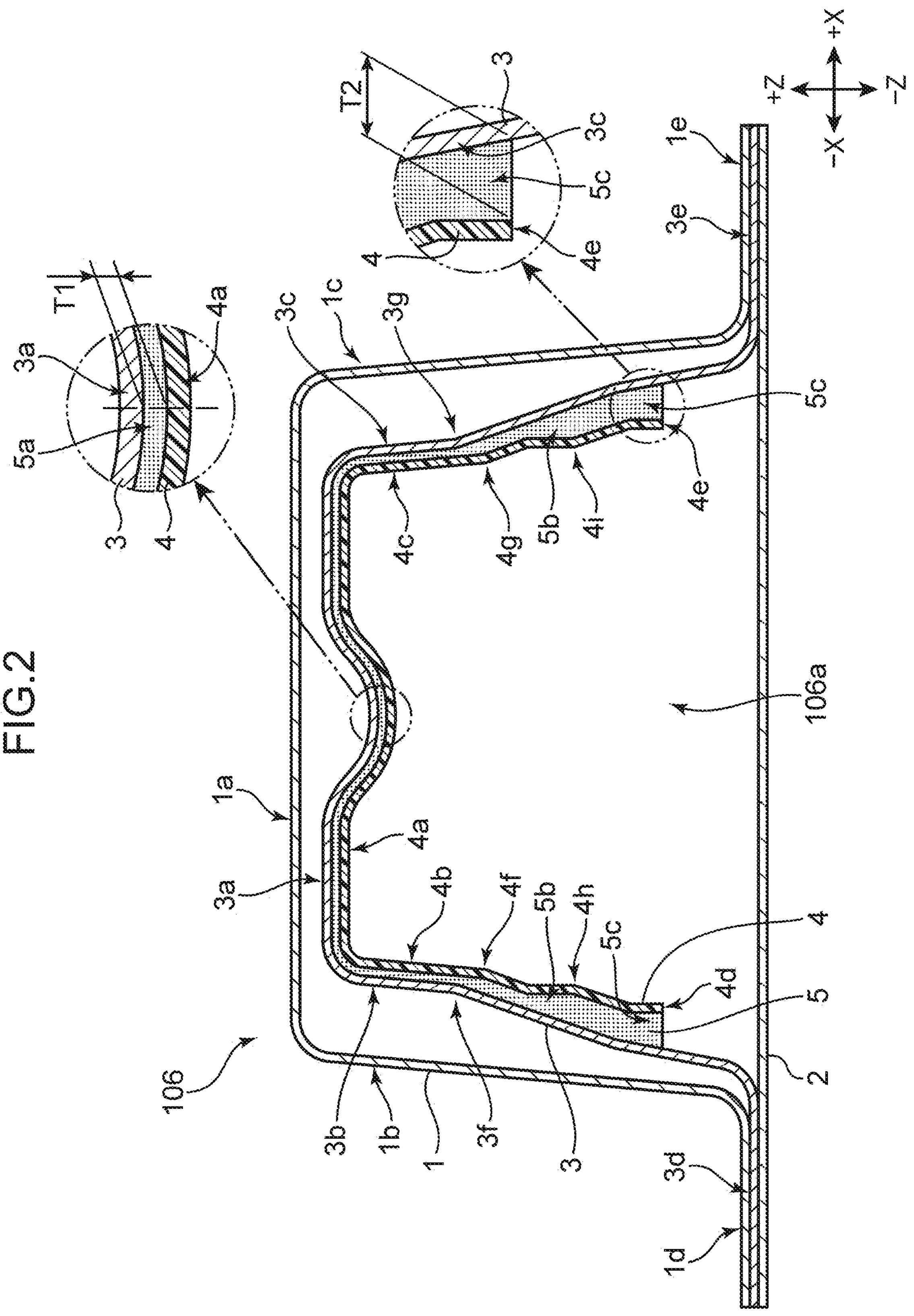
FIG. 2 is a cross-sectional view showing a cross section taken along line II-II of FIG. 1.

A cross-sectional structure of the center pillar 106 will be described with reference to FIG. 2. FIG. 2 is a cross-sectional view showing a cross section taken along line II-II of FIG. 1. In FIG. 2, a direction orthogonal to a paper surface corresponds to a "first direction", and an X direction corresponds to a "second direction". The same applies to directions in FIG. 3A and the subsequent drawings.

The center pillar (frame) 106 according to the present embodiment includes a pillar outer panel (outer wall member) 1, a pillar inner panel (bottom wall member) 2, a reinforcement (main body member) 3, a reinforcing member 4, and an adhesive layer 5. The pillar outer panel 1 has a hat-shaped cross-sectional shape in an X-Z cross section (a cross section in a direction intersecting the first direction in which the center pillar 106 extends). Specifically, the pillar outer panel 1 includes an outer shell top wall portion 1*a* extending in the X direction and the direction orthogonal to the paper surface, two outer shell side wall portions 1*b* and 1*c* continuous with the outer shell top wall portion 1*a* at opposite ends on a +X side and a −X side of the outer shell top wall portion 1*a* and extending toward a −Z side and in the direction orthogonal to the paper surface, and outer shell flange portions 1*d* and 1*e* continuous with the outer shell side wall portions 1*b* and 1*c* at −Z side ends of the outer shell side wall portions 1*b* and 1*c* and extending outwards in the X direction and the direction orthogonal to the paper surface.

The reinforcement 3 is made of a metal material (e.g., a steel plate), and has a hat-shaped cross-sectional shape smaller than the pillar outer panel 1 in the X-Z cross section. Specifically, the reinforcement 3 includes: a main body top wall portion (main body first wall portion) 3*a* disposed inside the outer shell top wall portion 1*a* and along the outer shell top wall portion 1*a* of the pillar outer panel 1; two main body side wall portions 3*b* and 3*c* continuous with the main body top wall portion 3*a* at opposite ends on the +X side and the −X side of the main body top wall portion 3*a* and disposed inside the outer shell side wall portions 1*b* and 1*c* and along the outer shell side wall portions 1*b* and 1*c*, respectively; and main body flange portions 3*d* and 3*e* continuous with the main body side wall portions 3*b* and 3*c* at ends on the −Z side of the main body side wall portions 3*b* and 3*c*, respectively, and extending outwards in the X direction and in the direction orthogonal to the paper surface.

The reinforcement 3 further has bent portions 3*f* and 3*g* that protrude, at middle parts in a Z direction of the main body side wall portions 3*b* and 3*c*, respectively, toward their opposed directions (X direction).

The pillar inner panel 2 is a flat plate-shaped member extending in the X direction and in the direction orthogonal to the paper surface. The pillar inner panel 2 is joined, at opposite ends in the X direction, to the outer shell flange portions 1*d* and 1*e* and the main body flange portions 3*d* and 3*e*. Thus, the center pillar 106 according to the present embodiment has an internal closed cross-sectional structure having a cross-sectional closed space 106*a* therein.

The reinforcing member 4 is made of a resin material (e.g., a fiber-reinforced resin material), and has a reinforcing top wall portion (reinforcing first wall portion) 4*a* and two reinforcing side wall portions 4*b* and 4*c*. The reinforcing top wall portion 4*a* is disposed inside the main body top wall portion 3*a* of the reinforcement 3 and along the main body top wall portion 3*a*. The two reinforcing side wall portions 4*b* and 4*c* are disposed inside the main body side wall portions 3*b* and 3*c* and along the main body side wall portions 3*b* and 3*c*, and are continuous, at their +Z side ends, with opposite ends of the reinforcing top wall portion 4*a*, respectively. The reinforcing side wall portions 4*b* and 4*c* are provided such that −Z-side end portions (reinforcing side end portions) 4*d* and 4*e* are provided to be apart on the +Z side from the pillar inner panel 2.

In addition, the reinforcing side wall portions 4*b* and 4*c* of the reinforcing member 4 have first bent portions 4*f* and 4*g* provided on inner sides of the bent portions 3*f* and 3*g* of the main body side wall portions 3*b* and 3*c*, respectively, and provided at middle parts in the Z direction so as to protrude toward their opposed directions (X direction). Furthermore, the reinforcing side wall portions 4*b* and 4*c* of the reinforcing member 4 have second bent portions 4*h* and 4*i* provided at positions more to the −Z side than the first bent portions 4*f* and 4*g*, respectively, and provided at middle parts in the Z direction so as to protrude toward their opposed directions (X direction).

The adhesive layer 5 is a layer made of an adhesive (e.g., an acrylic adhesive or an epoxy adhesive), and includes an adhesive top wall portion (adhesive first wall portion) 5*a* interposed between the main body top wall portion 3*a* and the reinforcing top wall portion 4*a* and joining the main body top wall portion 3*a* and the reinforcing top wall portion 4*a*, and an adhesive side wall portion 5*b*, 5*c* interposed between the main body side wall portion 3*b*, 3*c* and the reinforcing side wall portion 4*b*, 4*c* and joining the main body side wall portion 3*b*, 3*c* and the reinforcing side wall portion 4*b*, 4*c*. The adhesive layer 5 is formed such that a thickness T2 (a thickness of the adhesive side end portion 5*c*) between the main body side wall portions 3*b* and 3*c* and the reinforcing side wall portions 4*b* and 4*c* at the −Z-side ends of the reinforcing side wall portions 4*b* and 4*c* (reinforcing side end portions 4*d* and 4*e*) is larger than a thickness T1 between the main body top wall portion 3*a* and the reinforcing top wall portion 4*a* (a thickness of the adhesive top wall portion 5*a*). Specifically, the adhesive layer 5 is formed such that the thickness T1 is 0.1 mm or more and less than 1.0 mm and the thickness T2 is 1.0 mm or more.

3. Thickness of Adhesive Layer 5 and Adhesive Strength

Figure 3A:
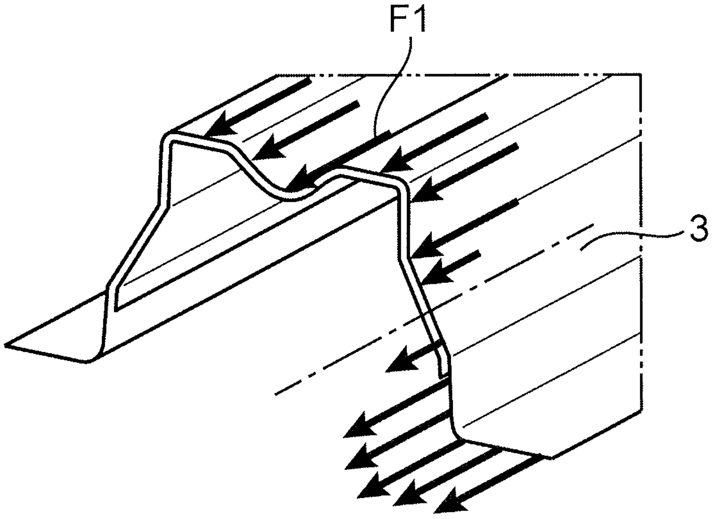
FIG. 3A is a schematic view showing an acting direction of a shearing force acting on an adhesive top wall portion when a compressive load is input to a main body top wall portion of a reinforcement.
Figure 3B:
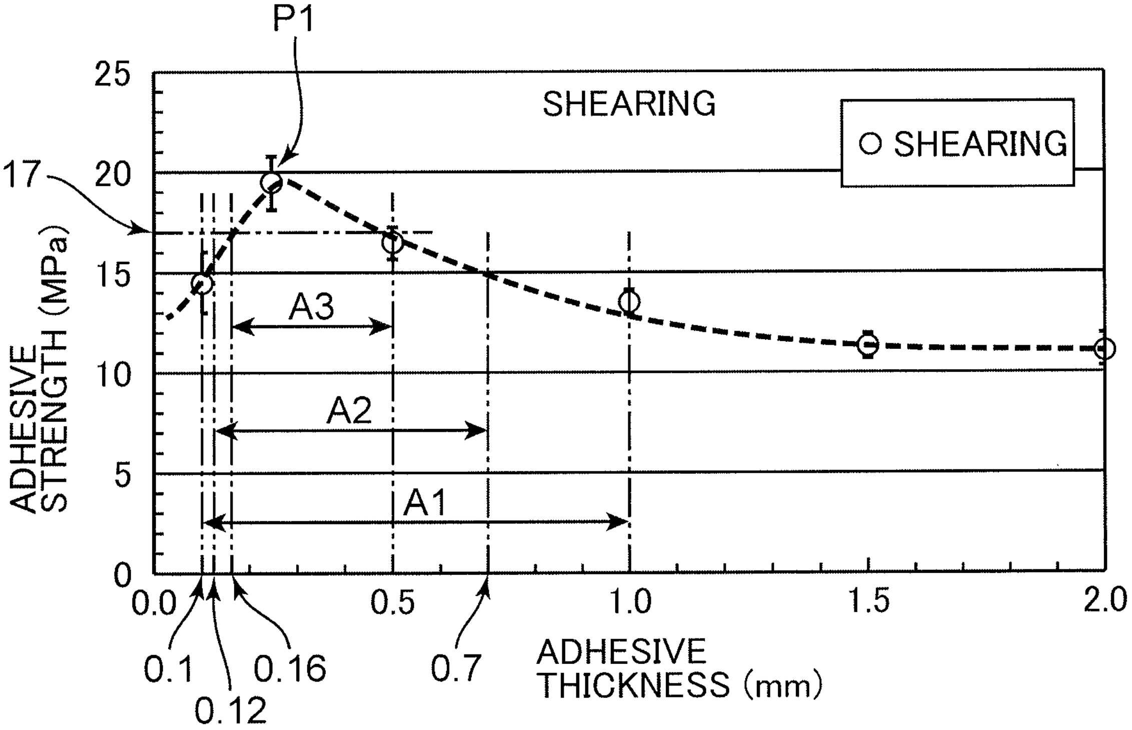
FIG. 3B is a graph showing a relationship between a thickness of an adhesive top wall portion in an adhesive layer and a shear strength.
Figure 4A:
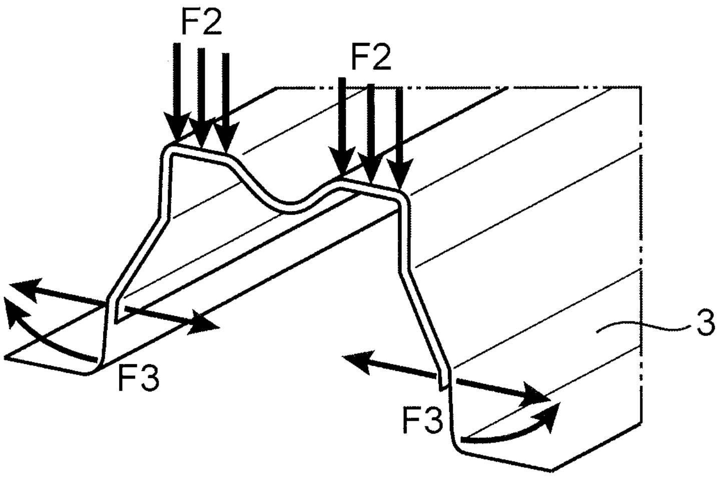
FIG. 4A is a schematic view showing an acting direction of a peeling force acting on an end of an adhesive side wall portion when the compressive load is input to the main body top wall portion of the reinforcement.
Figure 4B:
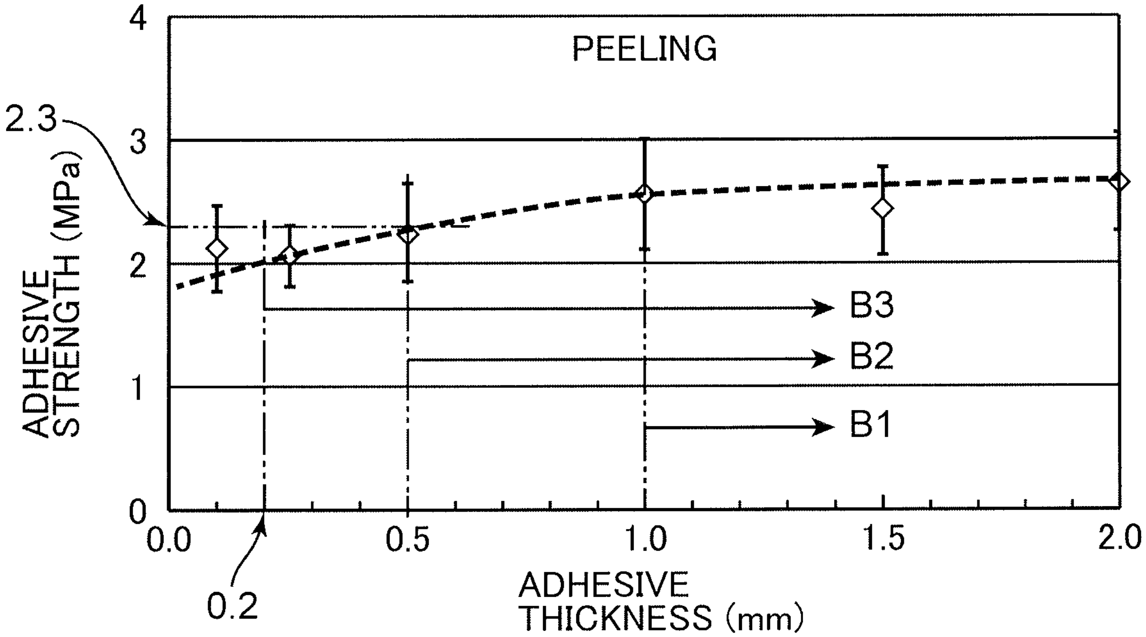
FIG. 4B is a graph showing a relationship between a thickness of the end of the adhesive side wall portion in the adhesive layer and a peeling strength.

A relationship between the thickness of the adhesive layer 5 and an adhesive strength will be described with reference to FIGS. 3A, 3B, 4A, and 4B. FIGS. 3A and 3B are diagrams for describing an adhesive strength against a shearing force F1 acting on the adhesive top wall portion 5*a* when a compressive load F2 in the −Z direction is input to the main body top wall portion 3*a* of the reinforcement 3. FIGS. 4A and 4B are diagrams for describing an adhesive strength against a peeling force F3 acting on the adhesive side end portion 5*c* as the compressive load F2 is input to the main body top wall portion 3*a*.

As shown in FIGS. 3A and 4A, when a bending moment acts as the compressive load F2 in the −Z direction is input to the main body top wall portion 3*a* of the reinforcement 3, the shearing force F1 is applied to the adhesive top wall portion 5*a* in a longitudinal direction of the center pillar 106.

As shown in FIG. 3B, when the adhesive strength in a shearing mode is shown in relation to the thickness TI of the adhesive layer 5, as the thickness (adhesive thickness) T1 of the adhesive layer 5 increases toward a point P1, the adhesive strength also gradually increases. At the point P1, the thickness T1 of the adhesive layer 5 is in the range of 0.25 mm to 0.26 mm, and the adhesive strength is in the range of 19 MPa to 20 MPa.

The adhesive strength gradually decreases as the thickness T1 of the adhesive layer 5 becomes smaller than that at the point P1. For example, the adhesive strength is 17 MPa when the thickness T1 is 0.5 mm, 15 MPa when the thickness T1 is 0.7 mm, and 13 MPa when the thickness T1 is 1.0 mm. As a result, when securing the adhesive strength in the shearing mode to be higher than 13 MPa, the thickness T1 of the adhesive top wall portion 5*a* in the adhesive layer 5 can be defined within a range A1 of 0.1 mm or more and less than 1.0 mm.

The reason why the thickness of the adhesive layer 5 is defined to be 0.1 mm or more is that it is considered to be difficult to uniformly form the adhesive layer 5 to be less than 0.1 mm in consideration of variations during manufacture of the center pillar 106.

In addition, when securing the adhesive strength in the shearing mode to be 15 MPa or higher, the thickness T1 of the adhesive top wall portion 5*a* in the adhesive layer 5 can be defined within a range A2 of 0.12 mm or more and 0.7 mm or less.

Furthermore, when securing the adhesive strength in the shearing mode to be 17 MPa or higher, the thickness T1 of the adhesive top wall portion 5*a* in the adhesive layer 5 can be defined within a range A3 of 0.16 mm or more and 0.5 mm or less.

The relationship between the thickness T1 of the adhesive layer 5 and the adhesive strength shown in FIG. 3B is an example, and varies depending on a kind of the material (adhesive) for forming the adhesive layer 5.

Next, as shown in FIG. 4A, when the compressive load F2 in the −Z direction is input to the main body top wall portion 3*a* of the reinforcement 3, the peeling force F3 in a direction of separating the reinforcing side wall portions 4*b* and 4*c* from the main body side wall portions 3*b* and 3*c* in a direction of the thickness of the adhesive layer 5 is applied to the adhesive side end portion 5*c*.

As shown in FIG. 4B, when the adhesive strength in a peeling mode is shown in relation to the thickness T2 of the adhesive layer 5, as the thickness T2 increases, the adhesive strength also gradually increases. Then, when the thickness T2 is 1.0 mm or more, the adhesive strength is saturated. Therefore, when the thickness T2 of the adhesive layer 5 is in a range B1 of 1.0 mm or more, a sufficient adhesive strength in the peeling mode can be secured.

When securing the adhesive strength in the peeling mode at 2.3 MPa or higher, the thickness T2 of the adhesive side end portion 5*c* of the adhesive layer 5 can be defined within a range B2 of 0.5 mm or more.

Furthermore, when securing the adhesive strength in the peeling mode at 2 MPa or higher, the thickness T2 of the adhesive top wall portion 5*a* of the adhesive layer 5 can be defined within a range B3 of 0.2 mm or more.

A relationship between the thickness T2 of the adhesive layer 5 and the adhesive strength shown in FIG. 4B is also an example, and varies depending on a kind of the material (adhesive) for forming the adhesive layer 5.

4. Thickness T2 of Adhesive Layer 5 and Crevice Corrosion at Adhesive Side End Portion 5*c*

In the center pillar 106, the adhesive layer 5 is formed so as to have the thickness T2 larger than the thickness T1. Specifically, in the adhesive layer 5, the thickness T2 of the adhesive side end portion 5*c* is defined to be 1.0 mm or more. As a result, it is possible to suppress occurrence of crevice corrosion in the reinforcing side end portions 4*d* and 4*e* and peripheral regions thereof in the reinforcing member 4. This will be described with reference to FIG. 5.

Figure 5:
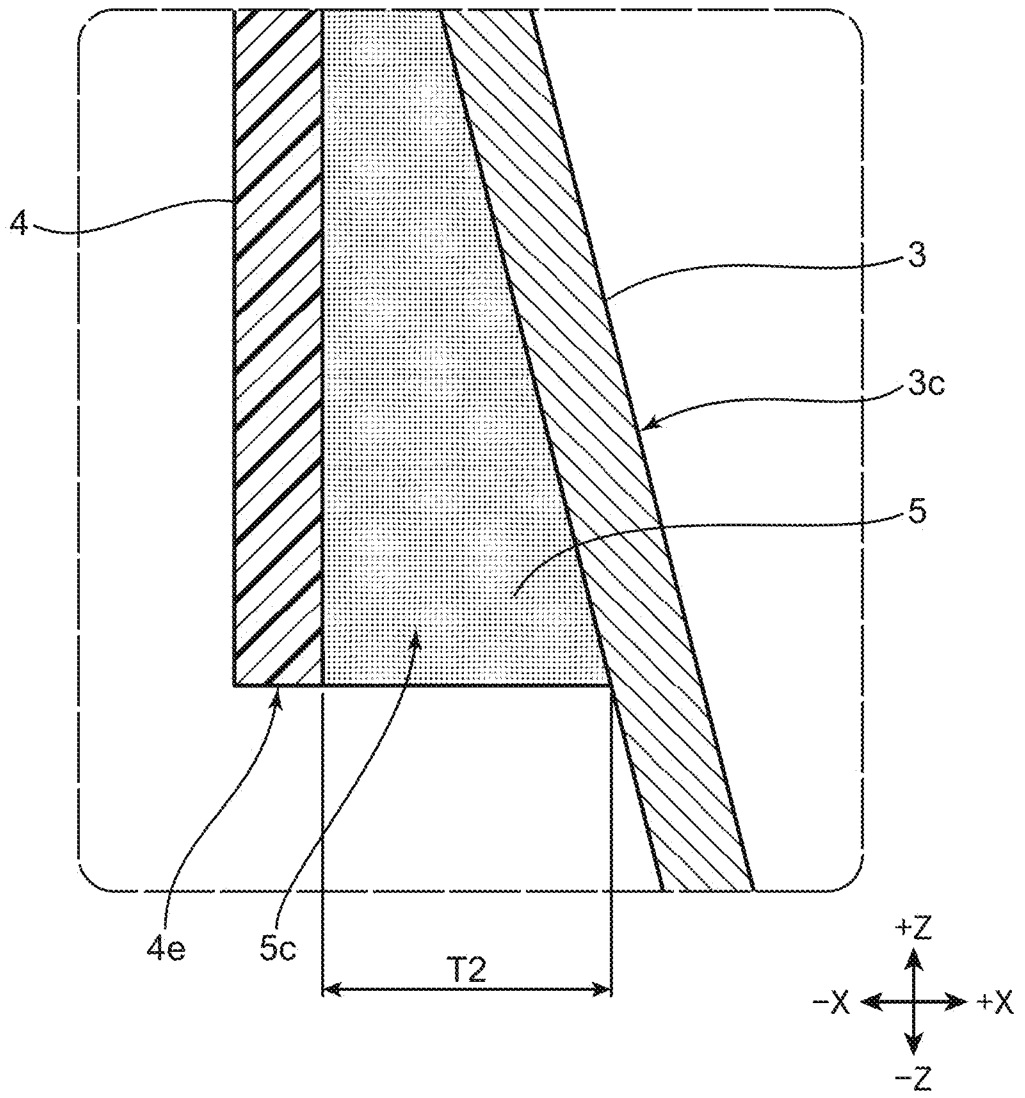
FIG. 5 is an enlarged cross-sectional view showing an end edge of a reinforcing member and a periphery thereof.

As shown in FIG. 5, in the center pillar 106, the reinforcing side end portion 4*d*, 4*e* (in FIG. 5, only the reinforcing side end portion 4*e* is shown) exists, and the reinforcing side end portion 4*d*, 4*e* is close to an inner wall surface of the main body side wall portion 3*b*, 3*c* of the reinforcement 3 via the adhesive side end portion 5*c* of the adhesive layer 5.

Here, moisture might adhere to the reinforcing side end portions 4*d* and 4*e* or the adhesive side end portion 5*c*. When moisture adheres to the reinforcing side end portions 4*d* and 4*e* and the like in this manner, it is considered that in the reinforcement 3 made of a metal material, parts of the main body side wall portions 3*b* and 3*c* close to the reinforcing side end portions 4*d* and 4*e* are liable to cause crevice corrosion.

However, in the center pillar 106, since the thickness T2 of the adhesive side end portion 5*c* is set to 1.0 mm or more to separate the reinforcing side end portions 4*d* and 4*e* from the inner wall surfaces of the main body side wall portions

3*b* and 3*c,* it is possible to suppress occurrence of crevice corrosion of the main body side wall portions 3*b* and 3*c* of the reinforcement 3.

For example, in a case where the reinforcing member 4 is made of a carbon fiber-reinforced resin, the reinforcing member 4 has conductivity and has a potential higher than that of the reinforcement 3 made of a metal material. However, in this case as well, since the adhesive side end portion 5*c* having the thickness T2 of 1.0 mm or more is interposed between the main body side wall portions 3*b* and 3*c* and the reinforcing side wall portions 4*b* and 4*c,* ion movement between the main body side wall portions and the reinforcing side wall portions is suppressed and occurrence of an electric corrosion is suppressed as well.

It is assumed that in the center pillar 106 of the vehicle 100 according to the present embodiment, a metal fastening member such as a rivet or a bolt is not used for joining the reinforcement 3 and the reinforcing member 4.

5. Effects

In the center pillar (frame) 106 of the vehicle 100 according to the present embodiment, since the adhesive layer 5 is formed to have the thickness T2 of the adhesive side end portion 5*c* larger than the thickness TI of the adhesive top wall portion 5*a,* a high adhesive strength of the adhesive side end portion 5*c* can be secured even when the compressive load F2 is input in the −Z direction to the main body top wall portion 3*a.* Therefore, in the center pillar 106, even if the thickness of the reinforcement 3 or the reinforcing member 4 is not increased, a high adhesive strength in the peeling mode at the adhesive side end portion 5*c* can be secured.

In addition, in the center pillar 106, the adhesive layer 5 is formed such that the thickness T1 of the adhesive top wall portion 5*a* is smaller than the thickness T2 of the adhesive side end portion 5*c.* Therefore, in the center pillar 106, even when a bending load acts on the center pillar 106 as the compressive load F2 is input to the main body top wall portion 3*a,* it is possible to secure a high adhesive strength in the shearing mode as compared with a case where the thickness T1 of the adhesive top wall portion 5*a* is made as large as the thickness T2 of the adhesive side end portion 5*c.*

Therefore, in the center pillar 106 according to the present embodiment, high strength and high rigidity are realized even without thickening the main body member and the reinforcing member.

Furthermore, in the center pillar 106, the adhesive layer 5 is formed such that the thickness T2 of the adhesive side end portion 5*c* is larger than the thickness T1 of the adhesive top wall portion 5*a.* Therefore, in the center pillar 106, the reinforcing side end portions 4*d* and 4*e* can be separated from the main body side wall portions 3*b* and 3*c* of the reinforcement 3 as compared with a case where the thickness T2 of the adhesive side end portion 5*c* is made as small as the thickness T1 of the adhesive top wall portion 5*a.* Therefore, in the center pillar 106, even if moisture adheres to the adhesive side end portion 5*c* or the like, it is possible to suppress occurrence of crevice corrosion in the reinforcing side end portions 4*d* and 4*e* of the reinforcing member 4 and in parts of the main body side wall portions 3*b* and 3*c* of the reinforcement 3, the parts being close to the adhesive side end portion 5*c.*

In addition, for the center pillar 106, a structure having the bent portions 3*f* and 3*g* in the two main body side wall portions 3*b* and 3*c,* respectively, is adopted. Therefore, in the center pillar 106, as compared with a case where the main body side wall portion 3*b,* 3*c* does not have the bent portion 3*f,* 3*g,* it is possible to secure a high bending strength of the reinforcement 3 when the compressive load F2 is input to the main body top wall portion 3*a.*

Also for the center pillar 106, a structure having the first bent portions 4*f* and 4*g* in the two reinforcing side wall portions 4*b* and 4*c* of the reinforcing member 4, respectively, is adopted. Therefore, in the center pillar 106, as compared with a case where the reinforcing side wall portion 4*b,* 4*c* does not have the first bent portion 4*f,*4*g,* it is advantageous in securing high reinforcing performance of the reinforcing member 4 with respect to the reinforcement 3 when the compressive load F2 is input to the main body top wall portion 3*a.*

Also for the center pillar 106, a structure is adopted in which the two reinforcing side wall portions 4*b* and 4*c* of the reinforcing member 4 have the second bent portions 4*h* and 4*i* in addition to the first bent portions 4*f* and 4*g,* respectively. Therefore, in the center pillar 106, it is advantageous in further improving the reinforcing performance of the reinforcing member 4 with respect to the reinforcement 3 as compared with a case where only the first bent portions 4*f* and 4*g* are provided in the two reinforcing side wall portions 4*b* and 4*c,* respectively.

In addition, the second bent portions 4*h* and 4*i* in the respective reinforcing side wall portions 4*b* and 4*c* are provided such that the reinforcing side wall portions 4*b* and 4*c* are separated from the main body side wall portions 3*b* and 3*c,* respectively. Thus, the second bent portions 4*h* and 4*i* enable the reinforcing side end portions 4*d* and 4*e* to be largely separated from the main body side wall portions 3*b* and 3*c,* respectively. Therefore, it is possible to secure a large thickness T2 of the adhesive layer 5 at the adhesive side end portion 5*c,* and it is further advantageous in securing a high adhesive strength in the peeling mode and in suppressing crevice corrosion when the compressive load F2 is input to the main body top wall portion 3*a.*

In the center pillar 106, the adhesive top wall portion 5*a* is set to have the thickness T1 of 0.1 mm or more. Therefore, at the time of manufacturing the center pillar 106, even when manufacturing errors such as uneven application of an adhesive are taken into consideration, a high adhesive strength between the main body top wall portion 3*a* and the reinforcing top wall portion 4*a* can be secured.

In addition, in the center pillar 106, the adhesive top wall portion 5*a* is set to have the thickness T1 of less than 1.0 mm. Therefore, even when a bending moment acts on the center pillar 106 as the compressive load F2 is input to the main body top wall portion 3*a,* it is advantageous in securing a high adhesive strength in the shearing mode as compared with a case where the thickness of the adhesive top wall portion 5*a* is made as large as 1.0 mm or more.

Furthermore, in the vehicle frame structure according to the above aspect, the thickness of the adhesive side end portion is set to be 1.0 mm or more. Therefore, even when a compressive load is input to the main body first wall portion, it is possible to secure a high adhesive strength between the main body member and the reinforcing member at the reinforcing side end portion, and it is therefore advantageous in securing a high peeling strength at the adhesive side end portion as compared with a case where the thickness of the adhesive side end portion is reduced to be less than 1.0 mm.

Also in the center pillar 106, the reinforcing member 4 is made of a resin material. As a result, the center pillar 106 is lighter and easier to manufacture than in a case where the reinforcing member 4 is made of a metal material. Therefore, in the center pillar 106, it is more advantageous to reinforce the strength of the reinforcement 3 made of a metal material with the reinforcing member 4 without hindering weight reduction.

In addition, for the center pillar 106, the reinforcing member 4 made of a fiber-reinforced resin material (CFRP, GFRP, etc.) is adopted. This allows the center pillar 106 to have an advantage in reinforcing the strength of the reinforcement 3 with the reinforcing member 4 having a high strength.

The center pillar 106 further includes the pillar inner panel (bottom wall member) 2. Therefore, in the center pillar 106, it is possible to realize an internal closed cross-sectional structure in which a cross section is closed by the reinforcement 3 and the pillar inner panel 2. As a result, it is further advantageous in securing a high strength of the center pillar 106 when the compressive load F2 in the −Z direction is input to the center pillar 106.

The center pillar 106 further includes the pillar outer panel (outer wall member) 1. Therefore, in the center pillar 106, the compressive load F2 to be input to the reinforcement 3 by the pillar outer panel 1 can be reduced. In addition, the pillar outer panel 1 enables direct adhesion of moisture to the reinforcement 3 and the reinforcing member 4 to be suppressed, which is more advantageous for suppressing crevice corrosion.

As described in the foregoing, in the center pillar 106 of the vehicle 100 according to the present embodiment, the bending strength can be improved without hindering weight reduction, and occurrence of crevice corrosion can be suppressed.

Modification

Figure 6:
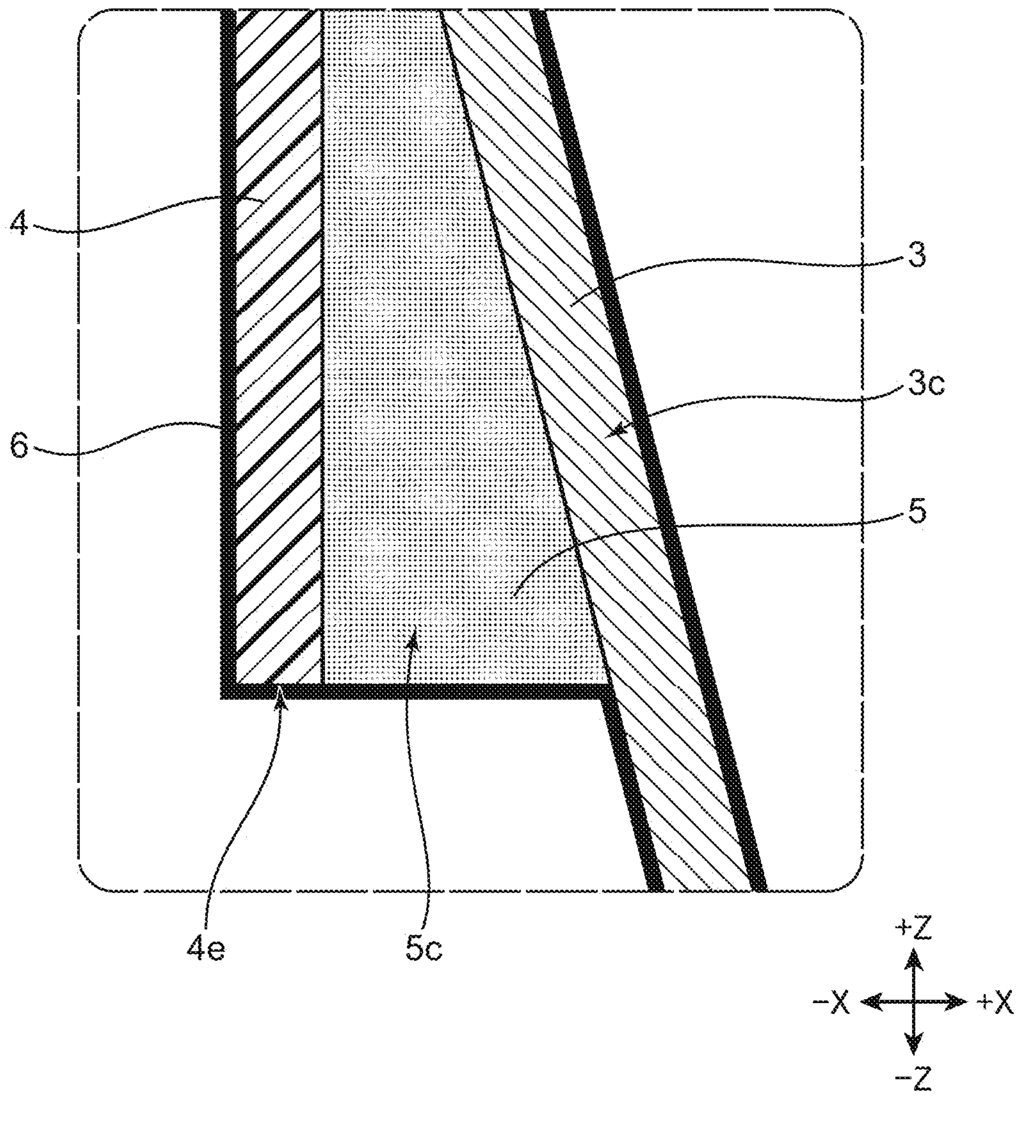
FIG. 6 is an enlarged cross-sectional view showing a part of a frame structure according to a modification.

A configuration of a center pillar 106 according to one modification of the above embodiment will be described with reference to FIG. 6. In FIG. 6, only the reinforcing side end portion 4*e* of the reinforcing member 4 and its periphery are extracted and shown. A part not shown in FIG. 6 has the same configuration as that of the above embodiment. Therefore, description of the same components will be omitted below.

As shown in FIG. 6, the center pillar 106 according to the present modification further includes an electrodeposition film 6. The electrodeposition film 6 is a film formed by electrodeposition coating, and is a film formed so as to coat each exposed part of the reinforcement 3, the reinforcing member 4, and the adhesive layer 5.

In the present modification, the electrodeposition film 6 is formed by cationic electrodeposition using an electrodeposition coating material containing an epoxy-based resin (e.g., urethane-modified epoxy resin). However, the electrodeposition film 6 may be a film formed by anionic electrodeposition using an electrodeposition coating material containing a polybutadiene-based resin.

The electrodeposition film 6 is formed so as to coat the reinforcing side end portion 4*e* of the reinforcing member 4, the main body side wall portion 3*c* of the reinforcement 3, and the like. Therefore, it is advantageous in suppressing crevice corrosion and electric corrosion.

Since the center pillar 106 according to the present modification has the same configuration as that of the above embodiment except for including the electrodeposition film 6, it is possible to obtain the same effects as those of the above embodiment.

Second Embodiment

A vehicle frame structure according to a second embodiment will be described with reference to FIG. 7.

Figure 7:
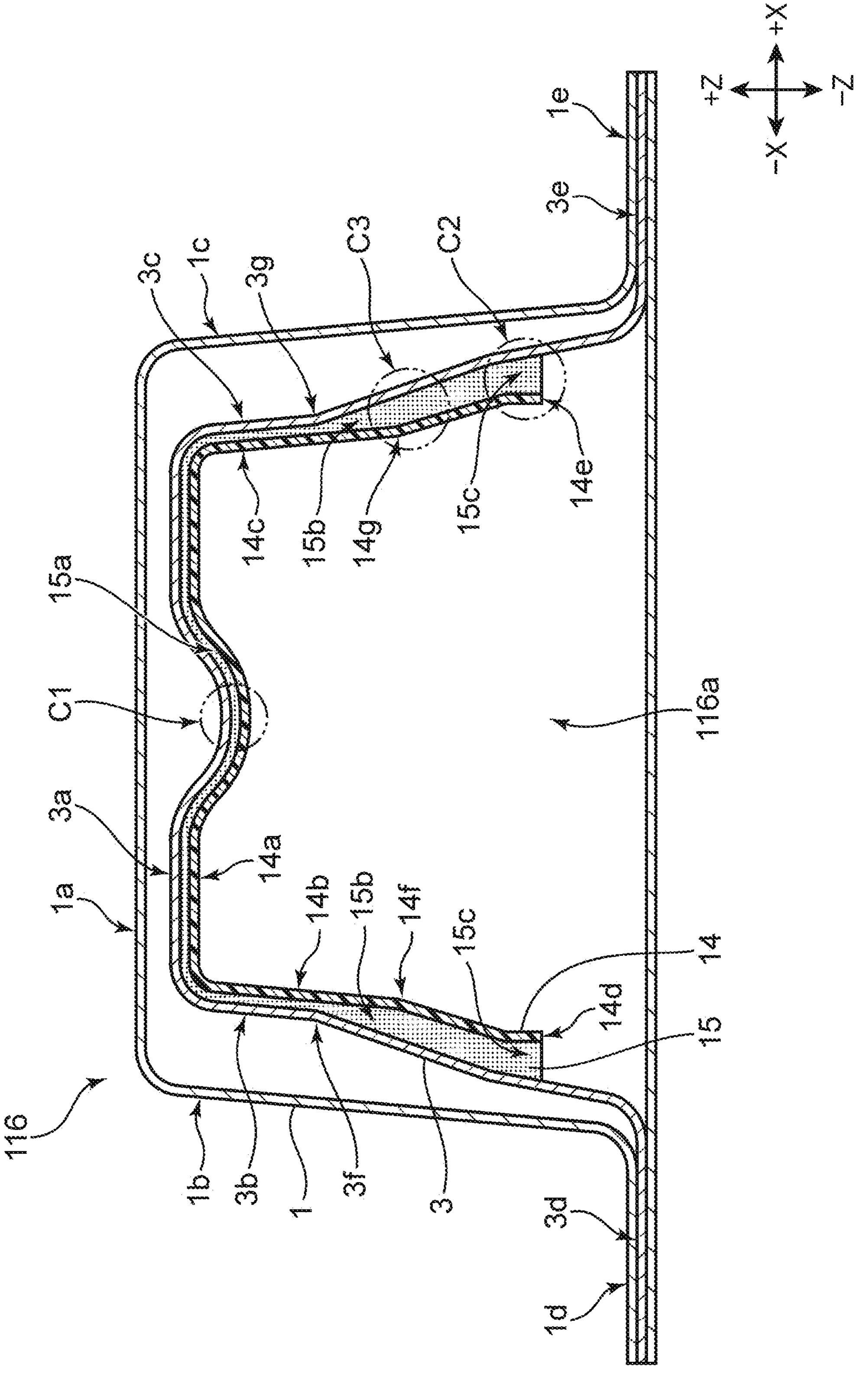
FIG. 7 is a cross-sectional view showing a frame structure according to a second embodiment.

As shown in FIG. 7, a frame 116 is a frame adopted for a center pillar as an example, and includes the pillar outer panel 1, the pillar inner panel 2, the reinforcement (main body member) 3, a reinforcing member 14, and an adhesive layer 15. Among them, configurations of the reinforcing member 14 and the adhesive layer 15 are different from those of the above first embodiment.

The reinforcing member 14 is made of a resin material (e.g., a fiber-reinforced resin material), and has a reinforcing top wall portion (reinforcing first wall portion) 14*a* and two reinforcing side wall portions 14*b* and 14*c*. The reinforcing top wall portion 14*a* is disposed inside the main body top wall portion 3*a* of the reinforcement 3 and along the main body top wall portion 3*a*. The two reinforcing side wall portions 14*b* and 14*c* are disposed inside the main body side wall portions 3*b* and 3*c* and along the main body side wall portions 3*b* and 3*c*, and are continuous, at their ends on the +Z side, with opposite ends of the reinforcing top wall portion 14*a*, respectively. The reinforcing side wall portions 14*b* and 14*c* are also disposed such that −Z-side end portions (reinforcing side end portions) 14*d* and 14*e* are located at positions not coming into contact with the pillar inner panel 2.

Similarly to the first embodiment, the reinforcing side wall portions 14*b* and 14*c* of the reinforcing member 14 have first bent portions 14*f* and 14*g* provided on inner sides of the main body side wall portions 3*b* and 3*c*, respectively, and at middle parts in the Z direction so as to protrude toward their opposed directions. However, in the present embodiment, unlike the first embodiment, the second bent portions 4*h* and 4*i* are not provided in the reinforcing side wall portions 14*b* and 14*c*.

In the frame 116 according to the present embodiment, formation positions of the first bent portions 14*f* and 14*g* in the reinforcing side wall portions 14*b* and 14*c* are arranged more to the −Z side than formation positions of the first bent portions 4*f* and 4*g* of the reinforcing side wall portions 4*b* and 4*c* in the first embodiment. In other words, in the frame 116 according to the present embodiment, the formation positions of the first bent portions 14*f* and 14*g* in the reinforcing side wall portions 14*b* and 14*c* are arranged more to the side of the reinforcing side end portions 14*d* and 14*e* than the formation positions of the first bent portions 4*f* and 4*g* of the reinforcing side wall portions 4*b* and 4*c* in the above embodiment. Therefore, in the present embodiment, a thickness of an adhesive side wall portion 15*b* at a part (C3 part) where the first bent portion 14*f*, 14 g is formed can be made larger than that in the first embodiment. Therefore, in the frame 116 according to the present embodiment, even with a manufacturing error or the like, a thickness of an adhesive side end portion 15*c* in the adhesive layer 15 (a thickness of a C2 part) can be reliably made larger than a thickness of an adhesive top wall portion 15*a* (a thickness of a C1 part).

This enables the frame 116 according to the present embodiment to more reliably obtain the same effects as those of the first embodiment.

Third Embodiment

A vehicle frame structure according to a third embodiment will be described with reference to FIG. 8.

Figure 8:
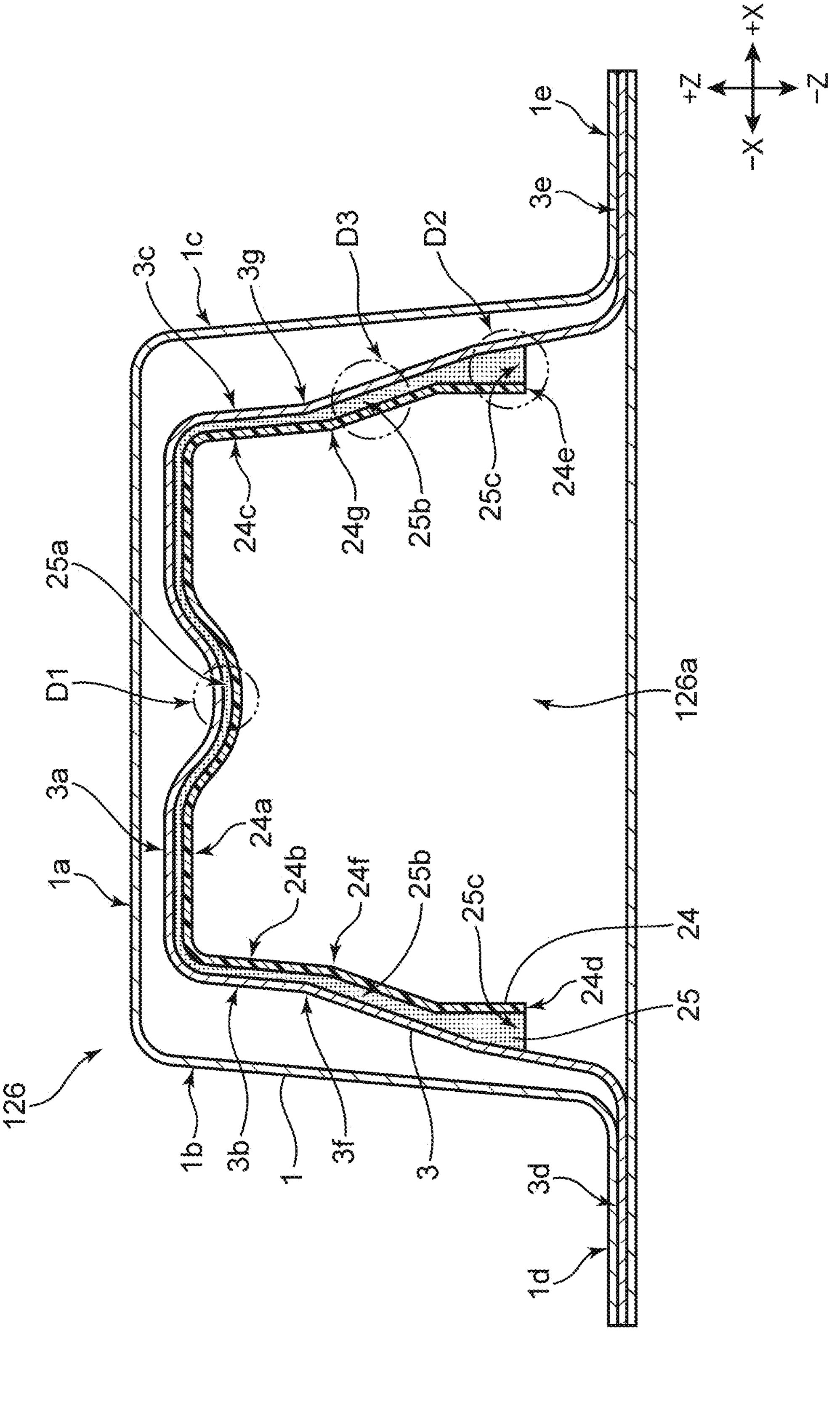
FIG. 8 is a cross-sectional view showing a frame structure according to a third embodiment.

As shown in FIG. 8, a frame 126 is a frame adopted for a center pillar as an example, and includes the pillar outer panel 1, the pillar inner panel 2, the reinforcement (main body member) 3, a reinforcing member 24, and an adhesive layer 25. Among them, configurations of the reinforcing member 24 and the adhesive layer 25 are different from those of the above first embodiment.

The reinforcing member 24 is made of a resin material (e.g., a fiber-reinforced resin material), and has a reinforcing top wall portion (reinforcing first wall portion) 24*a* and two reinforcing side wall portions 24*b* and 24*c*. The reinforcing top wall portion 24*a* is disposed inside the main body top wall portion 3*a* of the reinforcement 3 and along the main body top wall portion 3*a*. The two reinforcing side wall portions 24*b* and 24*c* are disposed inside the main body side wall portions 3*b* and 3*c* and along the main body side wall portions 3*b* and 3*c*, and are continuous, at their +Z side ends, with opposite ends of the reinforcing top wall portion 24*a*, respectively. The reinforcing side wall portions 24*b* and 24*c* are also provided such that −Z-side end portions (reinforcing side end portions) 24*d* and 24*e* are provided to be apart more to the +Z side from the pillar inner panel 2.

Similarly to the first embodiment, the reinforcing side wall portions 24*b* and 24*c* of the reinforcing member 24 have first bent portions 24*f* and 24*g* provided on the inner sides of the main body side wall portions 3*b* and 3*c*, respectively, and at middle parts in the Z direction so as to protrude toward their opposed directions (X direction). However, in the present embodiment, similarly to the second embodiment, the second bent portions 4*h* and 4*i* are not provided in the reinforcing side wall portions 24*b* and 24*c*.

In addition, in the frame 126 according to the present embodiment, formation positions of the first bent portions 24*f* and 24*g* in the reinforcing side wall portions 24*b* and 24*c* are arranged at substantially the same positions in the Z direction as the formation positions of the first bent portions 4*f* and 4*g* of the reinforcing side wall portions 4*b* and 4*c* in the first embodiment, and are arranged more to the +Z side than the formation positions of the first bent portions 14*f* and 14*g* of the reinforcing side wall portions 14*b* and 14*c* in the second embodiment. Therefore, in the present embodiment, a thickness of an adhesive side wall portion 25*b* at a part (D3 part) right under a part where the first bent portion 24*f*, 24*g* is formed can be made smaller than that in the above second embodiment. Therefore, in the frame 126 according to the present embodiment, a thickness of an adhesive side end portion 25*c* of the adhesive layer 25 (a thickness of a D2 part) can be made larger than a thickness of an adhesive top wall portion 25*a* (a thickness of a D1 part), and thicknesses of the adhesive side wall portions 25*b* and 25*c* of the adhesive layer 25 at the D3 part can be reduced, thereby reducing a weight of the frame 126 and suppressing cost increase.

Note that the frame 126 according to the present embodiment can also obtain effects similar to those of the first embodiment.

Fourth Embodiment

A vehicle frame structure according to a fourth embodiment will be described with reference to FIG. 9.

Figure 9:
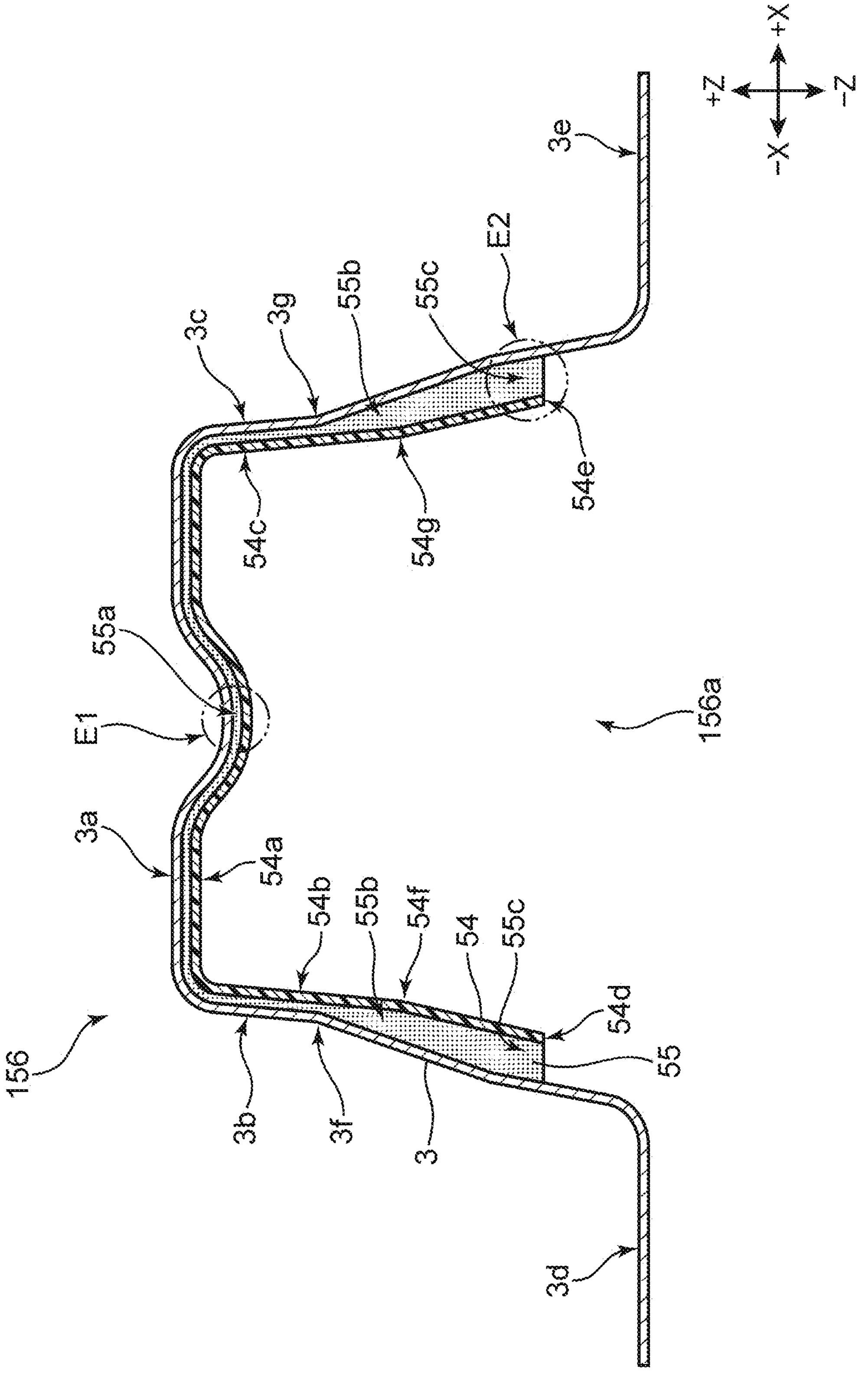
FIG. 9 is a cross-sectional view showing a frame structure according to a fourth embodiment.

As shown in FIG. 9, a frame 156 includes the main body member 3, a reinforcing member 54, and an adhesive layer 55. The frame 156 according to the present embodiment is different from the frame (center pillar) 116 according to the second embodiment in that the pillar outer panel 1 which is an outer wall member and the pillar inner panel 2 which is a bottom wall member are not provided. Since the frame 156 does not include a bottom wall member, the −Z side is opened. In other words, the frame 156 according to the present embodiment is a frame having an open cross-sectional structure having an opening 156*a* on the −Z side.

The reinforcing member 54 is made of a resin material (e.g., a fiber-reinforced resin material), and includes a reinforcing top wall portion (reinforcing first wall portion) 54*a* and two reinforcing side wall portions 54*b* and 54*c*. The reinforcing top wall portion 54*a* is disposed inside the main body top wall portion 3*a* of the reinforcement (main body member) 3 and along the main body top wall portion 3*a*. The two reinforcing side wall portions 54*b* and 54*c* are disposed inside the main body side wall portions 3*b* and 3*c* and along the main body side wall portions 3*b* and 3*c*, and are continuous, at their ends on the +Z side, with opposite ends of the reinforcing top wall portion 54*a*, respectively. In each of the reinforcing side wall portions 54*b* and 54*c*, −Z-side end portions (reinforcing side end portions) 54*d* and 54*e* are disposed at similar positions in the Z-direction to the reinforcing side end portions 14*d* and 14*e* of the reinforcing member 14 of the second embodiment.

Similarly to the second embodiment, the reinforcing side wall portions 54*b* and 54*c* of the reinforcing member 54 have first bent portions 54*f* and 54*g* provided on the inner sides of the main body side wall portions 3*b* and 3*c*, respectively, and at middle parts in the Z direction so as to protrude toward their opposed directions (X direction), and the second bent portions 4*h* and 4*i* are not provided.

Also in the frame 156 according to the present embodiment, the adhesive layer 55 is formed such that a thickness of an adhesive side end portion 55*c* (a thickness of an E2 portion), which is a −Z-side end of an adhesive side wall portion 55*b*, is larger than a thickness of an adhesive top wall portion 55*a* (a thickness of an E1 portion) in the adhesive layer 55.

Accordingly, the frame 156 according to the present embodiment can also obtain effects similar to those of the second embodiment.

Fifth Embodiment

A vehicle frame structure according to a fifth embodiment will be described with reference to FIG. 10.

Figure 10:
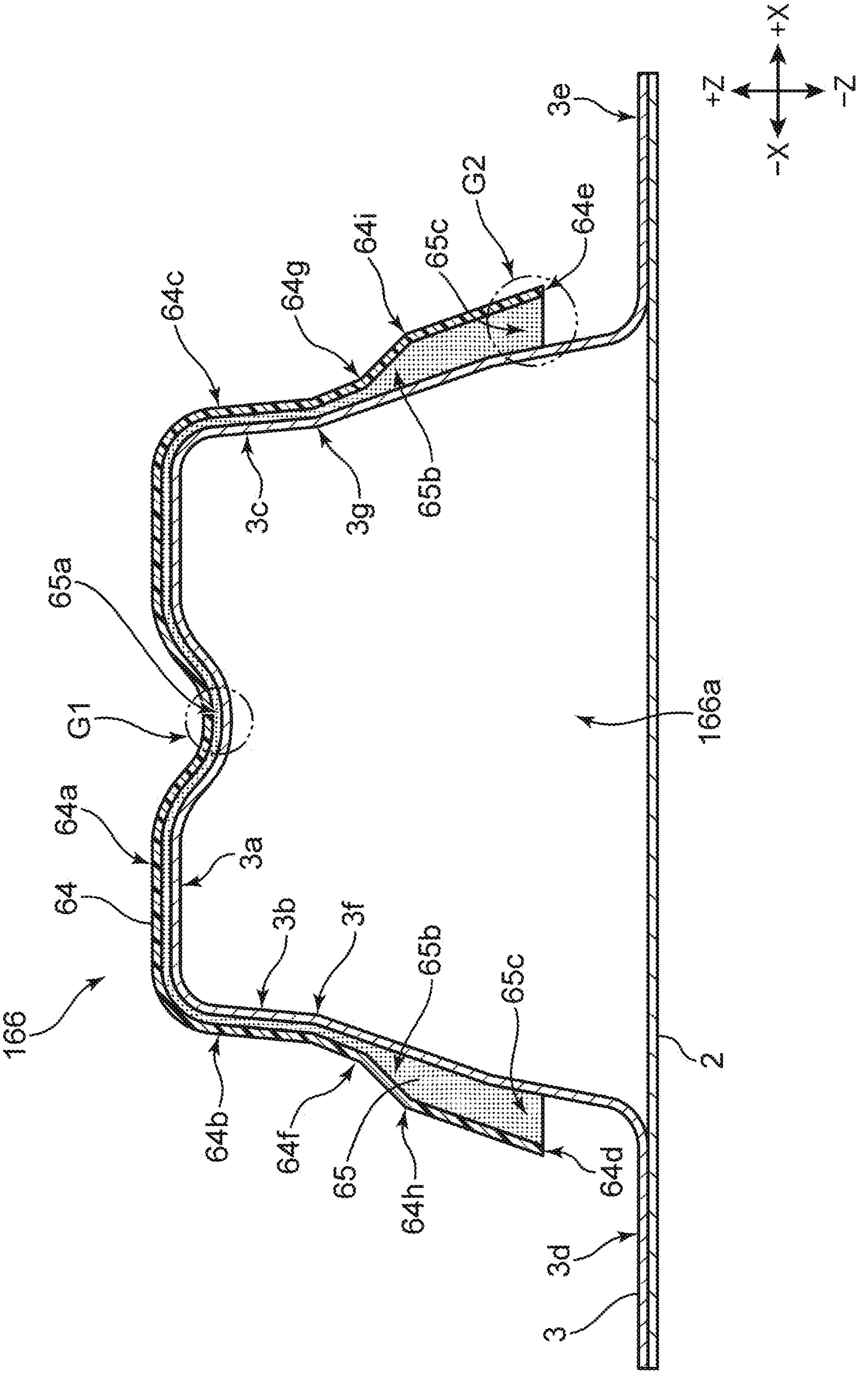
FIG. 10 is a cross-sectional view showing a frame structure according to a fifth embodiment.

As shown in FIG. 10, a frame 166 includes the pillar inner panel 2, the reinforcement (main body member) 3, a reinforcing member 64, and an adhesive layer 65. Similarly to the first embodiment, in the frame 166 according to the present embodiment, an opening on the −Z side of the reinforcement 3 is closed by the pillar inner panel 2, and has a cross-sectional closed space 166*a*. In other words, the frame 166 according to the present embodiment also has an internal closed cross-sectional structure. However, the frame 166 according to the present embodiment is different from that of the first embodiment in that the pillar outer panel 1 is not provided and that the reinforcing member 64 is disposed along an outer side of the cross section of the reinforcement 3.

The reinforcing member 64 is made of a resin material (e.g., a fiber-reinforced resin material), and includes a reinforcing top wall portion (reinforcing first wall portion) 64*a* and two reinforcing side wall portions 64*b* and 64*c*. The reinforcing top wall portion 64*a* is disposed outside the main body top wall portion 3*a* of the reinforcement 3 and along the main body top wall portion 3*a*. The two reinforcing side wall portions 64*b* and 64*c* are disposed outside the main body side wall portions 3*b* and 3*c* and along the main body side wall portions 3*b* and 3*c*, and are continuous, at their ends on the +Z side, with opposite ends of the reinforcing top wall portion 64*a*, respectively. Note that the reinforcing side wall portions 64*b* and 64*c* are provided such that −Z-side end portions (reinforcing side end portions) 64*d* and 64*e* are provided on the +Z side to be apart from the main body flange portions 3*d* and 3*e*, respectively.

The reinforcing side wall portions 64*b* and 64*c* of the reinforcing member 64 include, at middle parts in the Z direction and on the outer side of the main body side wall portions 3*b* and 3*c*, first bent portions 64*f* and 64*g* provided so as to protrude inward in the X direction, and second bent portions 64*h* and 64*i* that are provided at positions more on the −Z side than positions where the first bent portions 64*f* and 64*g* are formed and protrude outward in the X direction.

The adhesive layer 65 is a layer that joins an outer surface of the reinforcement 3 and an inner surface of the reinforcing member 64, and is formed using the same adhesive as the adhesive layer 5 or the like of the first embodiment. Also in the frame 166 according to the present embodiment, the adhesive layer 65 is formed such that a thickness of an adhesive side end portion 65*c* (a thickness of a G2 portion), which is a −Z-side end of the adhesive side wall portion 65*b*, is larger than a thickness of an adhesive top wall portion 65*a* (a thickness of a G1 portion).

In the frame 166 according to the present embodiment, since the first bent portions 64*f* and 64*g* and the second bent portions 64*h* and 64*i* are provided in the reinforcing side wall portions 64*b* and 64*c* of the reinforcing member 64, respectively, a thickness of the adhesive layer 65 is reliably increased in a part more on the −Z side than a part where the first bent portions 64*f* and 64*g* are formed while suppressing a thickness of the adhesive layer 65 in a part more on the +Z side than a part where the first bent portions 64*f* and 64*g* are formed.

The frame 166 according to the present embodiment can also obtain effects similar to those of the first embodiment.

Sixth Embodiment

A vehicle frame structure according to a sixth embodiment will be described with reference to FIG. 11.

Figure 11:
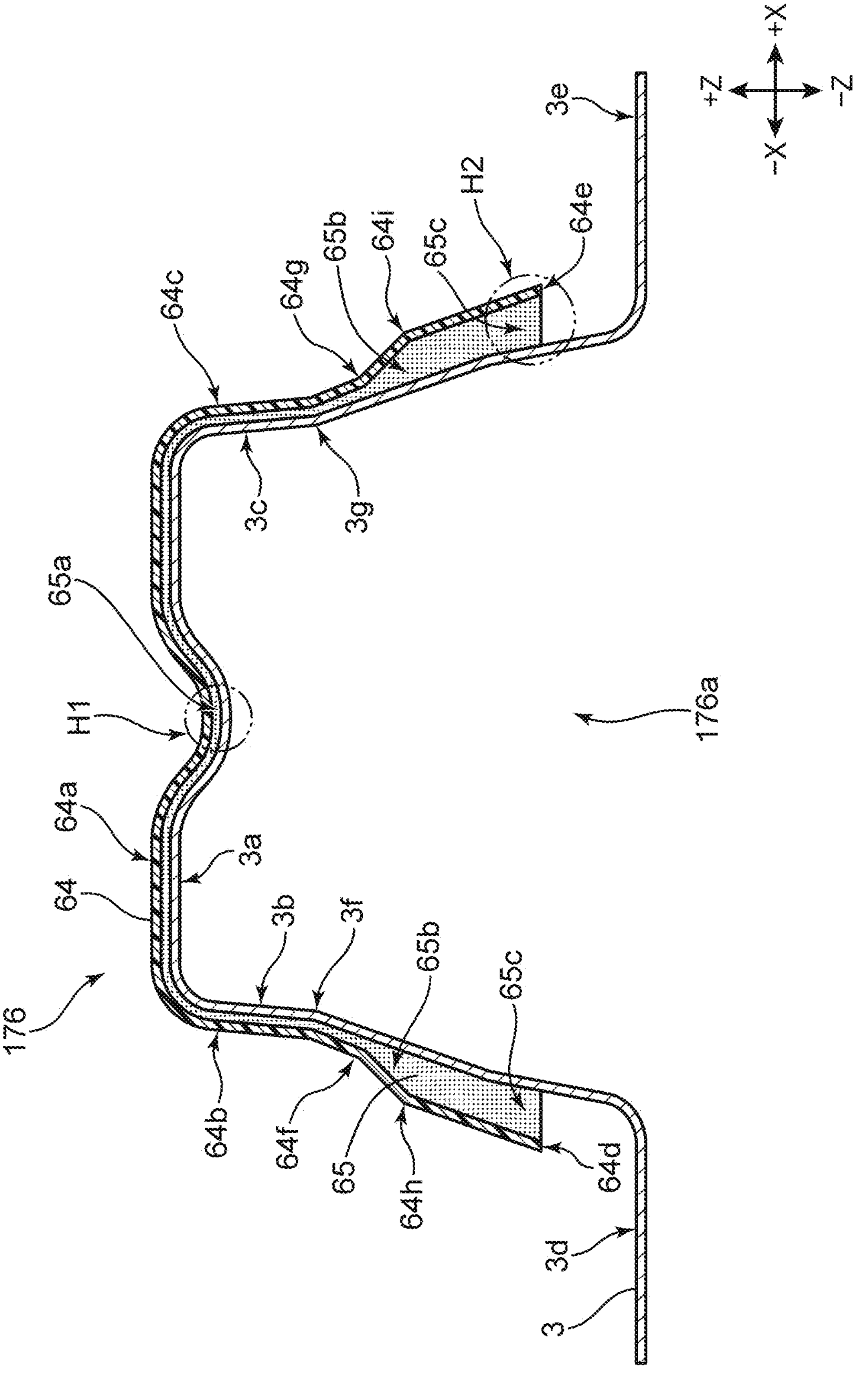
FIG. 11 is a cross-sectional view showing a frame structure according to a sixth embodiment.

As shown in FIG. 11, a frame 176 includes the main body member 3, the reinforcing member 64, and the adhesive layer 65. The frame 176 according to the present embodiment is different from the frame 166 according to the fifth embodiment in that the pillar inner panel 2 is not provided. Since the frame 176 does not include the pillar inner panel 2, a −Z side is opened. In other words, the frame 176 according to the present embodiment is a frame having an open cross-sectional structure having an opening 176*a* on the −Z side, similarly to the frame 156 according to the fourth embodiment.

The frame 176 according to the present embodiment has the same configuration as the frame 166 according to the fifth embodiment except for the above-described difference. Therefore, also in the frame 176, the adhesive layer 65 is formed such that a thickness of the adhesive side end portion 65*c* (a thickness of an H2 portion), which is a −Z-side end of the adhesive side wall portion 65*b*, is larger than a thickness of the adhesive top wall portion 65*a* (a thickness of an H1 portion). Accordingly, the frame 176 can also obtain effects similar to those of the frame 166 according to the fifth embodiment.

Seventh Embodiment

A vehicle frame structure according to a seventh embodiment will be described with reference to FIG. 12.

Figure 12:
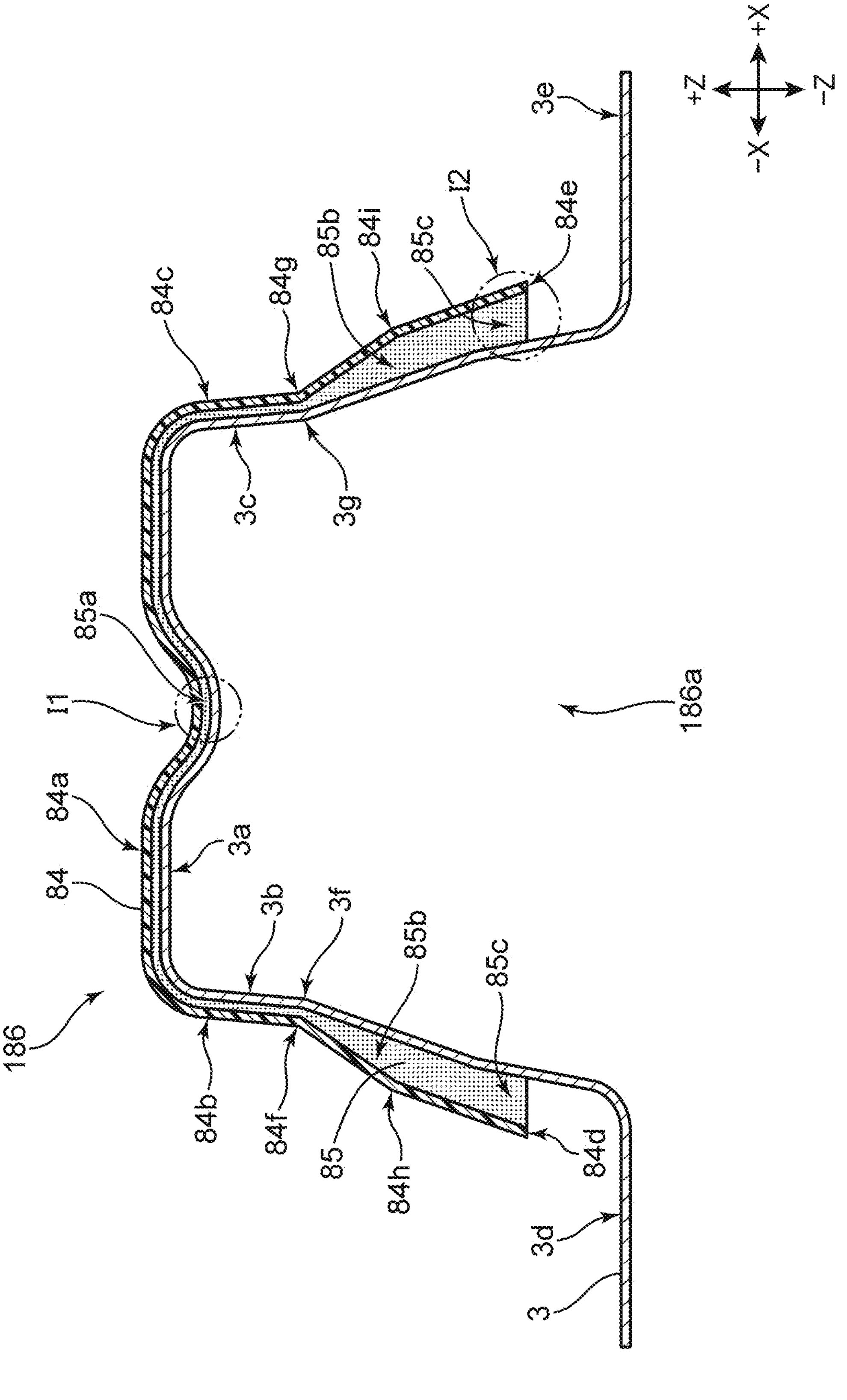
FIG. 12 is a cross-sectional view showing a frame structure according to a seventh embodiment.

As shown in FIG. 12, a frame 186 includes the main body member 3, a reinforcing member 84, and an adhesive layer 85. The frame 186 is different in a cross-sectional structure of the reinforcing member 84 from the reinforcing member 64 of the sixth embodiment. Specifically, although reinforcing side wall portions 84*b* and 84*c* of the reinforcing member 84 have first bent portions 84*f* and 84*g* and second bent portions 84*h* and 84*i*, respectively, the reinforcing member is different from the reinforcing member 64 of the sixth embodiment in that formation positions of the first bent portions 84*f* and 84*g* are at substantially the same height level as the bent portions 3*f* and 3*g* of the main body side wall portions 3*b* and 3*c* in the Z direction, respectively.

The frame 186 according to the present embodiment has the same configuration as the frame 176 according to the sixth embodiment except for the above-described difference. Therefore, also in the frame 186, the adhesive layer 85 is formed such that a thickness of an adhesive side end portion 85*c* (a thickness of an I2 portion), which is a −Z-side end of the adhesive side wall portion 85*b*, is larger than a thickness of an adhesive top wall portion 85*a* (a thickness of an I1 portion). Accordingly, the frame 186 can also obtain effects similar to those of the frame 176 according to the sixth embodiment.

In addition, in the frame 186 according to the present embodiment, by setting the formation positions of the first bent portions 84*f* and 84*g* in the reinforcing side wall portions 84*b* and 84*c* of the reinforcing member 84 in a manner as shown in FIG. 12, a thickness change of the adhesive layer 85 between the first bent portions 84*f* and 84*g* and the second bent portions 84*h* and 84*i*, respectively, can be made more moderate than that of the frame 176 according to the sixth embodiment. Therefore, when the reinforcement (main body member) 3 and the reinforcing member 84 are to be joined to each other by applying an adhesive, it is possible to secure high fluidity of the adhesive between the main body side wall portions 3*b* and 3*c* of the reinforcement 3 and the reinforcing side wall portions 84*b* and 84*c* of the reinforcing member 84, respectively. Therefore, air bubbles and the like hardly remain in the adhesive layer 85, which is suitable for obtaining a high adhesive strength.

Eighth Embodiment

A vehicle frame structure according to an eighth embodiment will be described with reference to FIG. 13.

Figure 13:
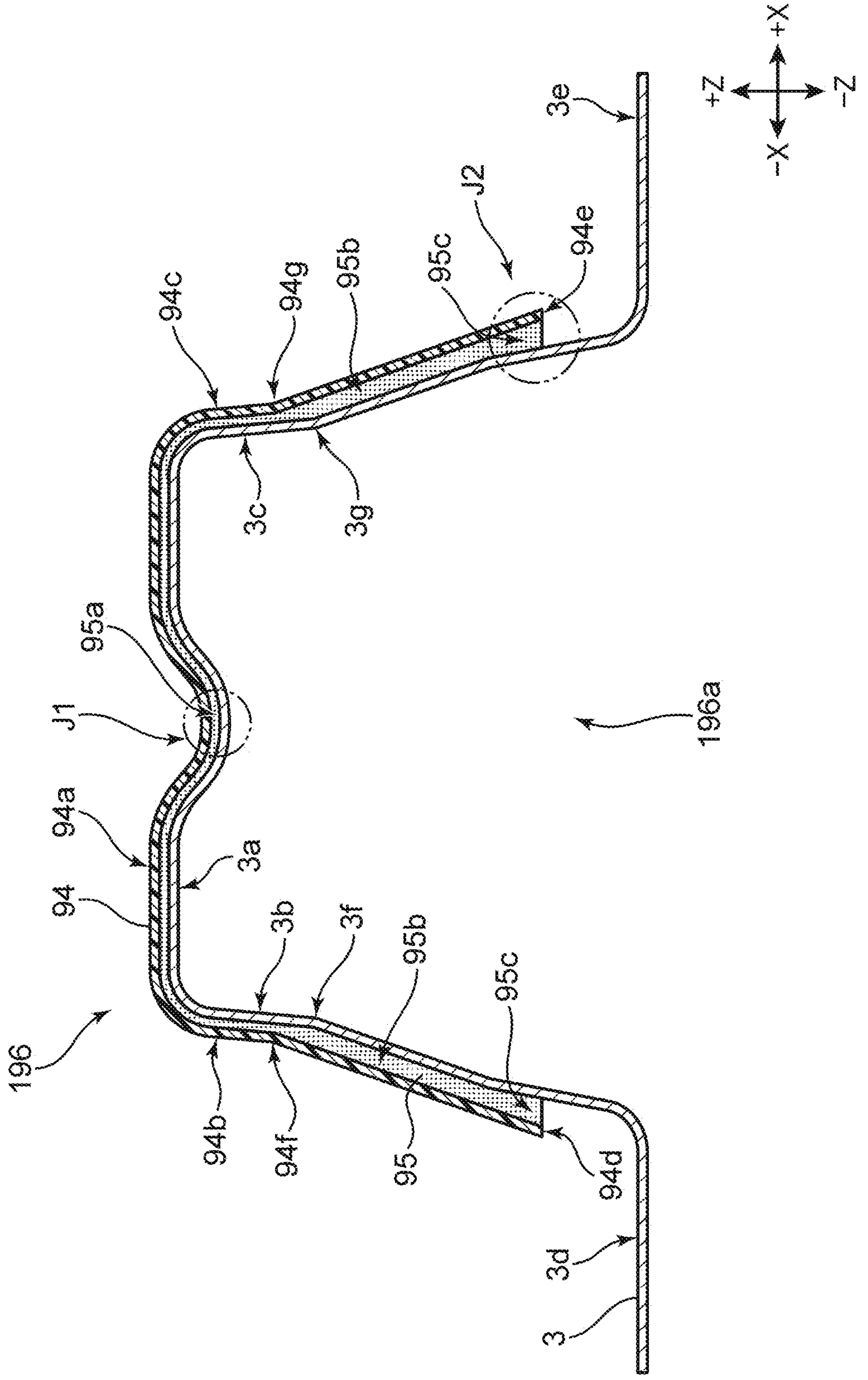
FIG. 13 is a cross-sectional view showing a frame structure according to an eighth embodiment.

As shown in FIG. 13, a frame 196 includes the main body member 3, a reinforcing member 94, and an adhesive layer 95. The frame 196 is different from the reinforcing member 84 of the seventh embodiment in a cross-sectional structure of the reinforcing member 94. Specifically, while reinforcing side wall portions 94*b* and 94*c* of the reinforcing member 94 have first bent portions 94*f* and 94*g*, respectively, the reinforcing side wall portions do not have bent portions on the −Z side of the first bent portions 94*f* and 94*g*. In addition, the first bent portions 94*f* and 94*g* of the reinforcing side wall portions 94*b* and 94*c* are different from the reinforcing member 84 of the seventh embodiment in that the first bent portions are provided at positions more on the +Z side than the bent portions 3*f* and 3*g* of the main body side wall portions 3*b* and 3*c* in the Z direction, respectively.

In the frame 196, parts of the reinforcing side wall portions 94*b* and 94*c* of the reinforcing member 94 more on the −Z side than parts where the first bent portions 94*f* and 94*g* are provided are disposed along outer surfaces of the main body side wall portions 3*b* and 3*c* of the reinforcement (main body member) 3. Note that as described above, the first bent portions 94*f* and 94*g* of the reinforcing side wall portions 94*b* and 94*c* are disposed more on the +Z side than the first bent portions 84*f* and 84*g* of the reinforcing side wall portions 84*b* and 84*c* of the seventh embodiment, respectively. Therefore, the frame 196 is formed such that a thickness of an adhesive side end portion 95*c* (a thickness of a J2 portion), which is a −Z-side end of each adhesive side wall portion 95*b*, is larger than a thickness of an adhesive top wall portion 95*a* (a thickness of a J1 portion). Accordingly, the frame 196 can also obtain effects similar to those of the frame 186 according to the seventh embodiment.

In addition, in the frame 196, parts of the reinforcing side wall portions 94*b* and 94*c* more on the −Z side than the first bent portions 94*f* and 94*g* are disposed along the outer surfaces of the main body side wall portions 3*b* and 3*c* of the reinforcement 3. Therefore, in the frame 196, a thickness of the adhesive layer 95 at the relevant part can be made smaller than that of the adhesive layer 85 of the seventh embodiment. Therefore, the frame 196 can be reduced in weight and in manufacturing cost.

Ninth Embodiment

A vehicle frame structure according to a ninth embodiment will be described with reference to FIG. 14.

Figure 14:
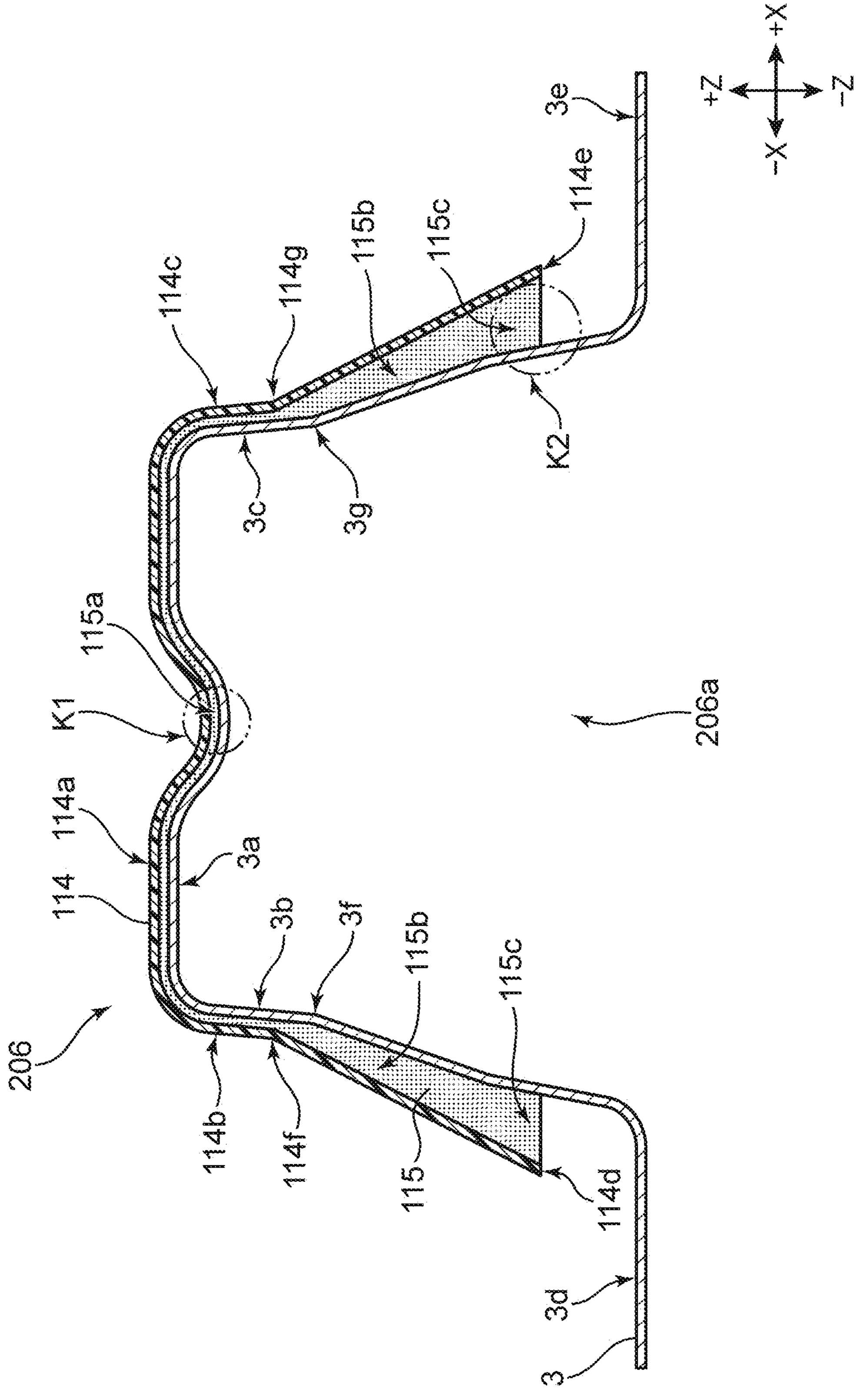
FIG. 14 is a cross-sectional view showing a frame structure according to a ninth embodiment.

As shown in FIG. 14, a frame 206 includes the main body member 3, a reinforcing member 114, and an adhesive layer 115. The frame 206 is different from the reinforcing member 94 of the eighth embodiment in a cross-sectional structure of the reinforcing member 114. Specifically, parts of the reinforcing side wall portions 114*b* and 114*c* of the reinforcing member 114 more on the −Z side than the first bent portions 114*f* and 114*g*, respectively, are formed so as to be gradually separated outward in the X direction from the main body side wall portions 3*b* and 3*c* of the reinforcement (main body member) 3 toward the −Z side from the first bent portions 114*f* and 114*g*.

The adhesive layer 115 is formed such that while parts of adhesive side wall portions 115*b* and 115*c* more on the +Z side than the first bent portions 114*f* and 114*g* have the same thickness as an adhesive top wall portion 115*a*, parts more on the −Z side than the first bent portions 114*f* and 114*g* gradually increase in thickness. Then, also in the present embodiment, the frame 206 is formed such that a thickness of the adhesive side end portion 115*c* (a thickness of a K2 portion), which is a −Z-side end of each adhesive side wall portion 115*b*, is larger than a thickness of the adhesive top wall portion 115*a* (a thickness of a K1 portion). Accordingly, the frame 206 can also obtain effects similar to those of the frame 186 according to the eighth embodiment.

In addition, for the frame 206, a configuration is adopted in which a thickness of the adhesive layer 115 gradually increases in a part more on the −Z side than formation positions of the first bent portions 114*f* and 114*g*. Therefore, in the frame 206, the thickness of the adhesive side end portion 115*c* can be reliably made larger than the thickness of the adhesive top wall portion 115*a*, and air bubbles and the like hardly remain in the adhesive layer 115, which is advantageous in obtaining a high adhesive strength.

Other Modifications

Although in the first to third embodiments and the modification described above, the center pillars 106, 116, and 126 are adopted as examples of a vehicle frame, the present invention can be applied to various vehicle frames. For example, the present invention can be applied to a roof side rail, a front pillar, a side sill, and the like. In addition, the present invention can be applied to various vehicles such as railway vehicles and freight vehicles.

In addition, in the first to ninth embodiments and the modification described above, a metal material is adopted as a constituent material of the main body member, one example of which is the reinforcement 3, and a resin material such as a fiber-reinforced resin is adopted as a constituent material of the reinforcing member 4, 14, 24, 54, 64, 84, 94, 114. The present invention is, however, not limited thereto. For example, the main body member and the reinforcing member may be made of resin materials different from each other, or may be made of metal materials different from each other.

In addition, although in the first to ninth embodiments and the modification described above, the reinforcement 3 in which the main body side wall portions 3*b* and 3*c* are provided with the bent portions 3*f* and 3*g* is adopted, in the present invention, the bent portion may not necessarily be provided in the main body side wall portion of the main body member. Similarly, in the first to ninth embodiments and the modification described above, the reinforcing members 4, 14, 24, 54, 64, 84, 94, and 114 are adopted in which the reinforcing side wall portions 4*b*, 4*c*, 14*b*, 14*c*, 24*b*, 24*c*, 54*b*, 54*c*, 64*b*, 64*c*, 84*b*, 84*c*, 94*b*, 94*c*, 114*b*, and 114*c* are provided with the first bent portions 4*f*, 4*g*, 14*f*, 14*g*, 24*f*, 24*g*, 54*f*, 54*g*, 64*f*, 64*g*, 84*f*, 84*g*, 94*f*, 94*g*, 114*f*, and 114*g* or the second bent portions 4*h*, 4*i*, 64*h*, 64*i*, 84*h*, and 84*i*. The first bent portion and the second bent portion may not necessarily be provided in the reinforcing side wall portion of the reinforcing member.

In addition, the relationship between the thickness of the adhesive layer and the adhesive strength shown in FIGS. 3B and 4B is an example, and varies depending on a kind of adhesive to be used.

Furthermore, although the above modifications are assumed to be variations of the first embodiment, the modification can be applied to the respective frames 116, 126, 156, 166, 176, 186, 196, and 206 of the above-described second to ninth embodiments.

Conclusion

A vehicle frame structure according to an aspect of the present invention includes a main body member, a reinforcing member, and an adhesive layer. The main body member is an elongated member. The reinforcing member is an elongated member extending along the main body member in a first direction in which the main body member extends, and is made of a material different from the main body member. The adhesive layer is a layer made of an adhesive that joins the main body member and the reinforcing member to each other.

In the vehicle frame structure according to the present aspect, in a cross section orthogonal to the first direction, the main body member includes a main body first wall portion extending in a second direction that is one direction included in the cross section, and two main body side wall portions that are continuous with the main body first wall portion at opposite ends of the main body first wall portion, respectively, and extend in a direction intersecting the second direction.

In addition, in the vehicle frame structure according to the present aspect, in the cross section, the reinforcing member includes a reinforcing first wall portion extending in the second direction along the main body first wall portion, and two reinforcing side wall portions that are continuous with the reinforcing first wall portion at opposite ends of the reinforcing first wall portion, respectively, and extend in the direction intersecting the second direction along the main body side wall portions.

Furthermore, in the vehicle frame structure according to the present aspect, the main body first wall portion is a wall portion to which a compressive load is input in a direction intersecting both the first direction and the second direction, and the reinforcing member includes a reinforcing side end portion that is an end edge on a side opposite to a continuous part with the reinforcing first wall portion in each of the two reinforcing side wall portions. Then, the adhesive layer is formed such that a thickness between the main body side wall portion and the reinforcing side wall portion at the reinforcing side end portion is larger than a thickness between the main body first wall portion and the reinforcing first wall portion.

In the vehicle frame structure according to the above aspect, the adhesive layer is formed such that the thickness of the adhesive layer between the main body side wall portion and the reinforcing side wall portion at the reinforcing side end portion (hereinafter, referred to as "adhesive side end portion") is larger than the thickness of the adhesive layer between the main body first wall portion and the reinforcing first wall portion (hereinafter, referred to as "adhesive first wall portion"). Therefore, in the frame structure, even when a compressive load is input to the main body first wall portion, a high adhesive strength in the peeling mode can be secured between the main body member and the reinforcing member at the reinforcing side end portion.

In addition, in the vehicle frame structure according to the above aspect, the adhesive layer is formed such that the thickness of the adhesive first wall portion is smaller than the thickness of the adhesive side end portion. Therefore, in the vehicle frame structure according to the above aspect, even when a bending moment acts on the frame structure as the compressive load is input to the main body first wall portion, it is possible to secure a high adhesive strength in the shearing mode as compared with a case where the thickness of the adhesive first wall portion is made as large as the thickness of the adhesive side end portion.

Accordingly, in the vehicle frame structure according to the above aspect, a high adhesive strength in both the shearing mode and the peeling mode when a compressive load is input can be secured even without thickening the main body member and the reinforcing member.

Furthermore, in the vehicle frame structure according to the above aspect, the adhesive layer is formed such that the thickness of the adhesive side end portion is larger than the thickness of the adhesive first wall portion. Therefore, in the vehicle frame structure according to the above aspect, the reinforcing side end portion can be more separated from the main body side wall portion of the main body member as compared with a case where the thickness of the adhesive side end portion is reduced to be as small as the thickness of the adhesive first wall portion. Therefore, in the vehicle frame structure according to the above aspect, even if moisture adheres to the adhesive side end portion, it is possible to suppress occurrence of crevice corrosion in the reinforcing side end portion of the reinforcing member and in parts of the main body side wall portion close to the adhesive side end portion.

In the vehicle frame structure according to the above aspect, in the cross section, each of the two main body side wall portions may have, at a middle part in an extending direction, one or more bent portions that are bent toward sides facing each other.

In the vehicle frame structure according to the above aspect, a structure in which each of the two main body side wall portions has a bent portion is adopted. Therefore, in the vehicle frame structure according to the above aspect, a bending strength of the main body member when a compressive load is input to the main body first wall portion can be more improved as compared with a case where the main body side wall portion does not have a bent portion (as compared with a case where the main body side wall portion has a flat plate shape).

In the vehicle frame structure according to the above aspect, in the cross section, each of the two reinforcing side wall portions may have a first bent portion formed so as to be bent along the bent portion.

In the vehicle frame structure according to the above aspect, a structure having a first bent portion in each of the two reinforcing side wall portions is adopted. Therefore, in the vehicle frame structure according to the above aspect, as compared with a case where the reinforcing side wall portion does not have the first bent portion (as compared with a case where the reinforcing side wall portion has a flat plate shape), it is advantageous in securing high reinforcing performance of the reinforcing member with respect to the main body member when a compressive load is input to the main body first wall portion.

In the vehicle frame structure according to the above aspect, in the cross section, each of the two reinforcing side wall portions may have, at a part more to a side of the reinforcing side end portion than the first bent portion, a second bent portion that is bent so as to be separated from the main body side wall portion.

In the vehicle frame structure according to the above aspect, a structure in which each of the two reinforcing side wall portions includes the second bent portion in addition to the first bent portion is adopted. Therefore, in the vehicle frame structure according to the above aspect, it is advantageous in further improving the reinforcing performance of the reinforcing member with respect to the main body member as compared with a case where only the first bent portion is provided in each of the two reinforcing side wall portions.

In addition, the second bent portions in the respective reinforcing side wall portions are provided such that the reinforcing side wall portions are separated from the main body side wall portions. Therefore, the vehicle frame structure according to the above aspect is allowed to have a configuration in which the reinforcing side end portion is largely separated from the main body side wall portion. Therefore, it is possible to secure a large thickness of the adhesive layer at the adhesive side end portion, and it is more advantageous in securing a high adhesive strength in the peeling mode and in suppressing crevice corrosion when a compressive load is input.

In the vehicle frame structure according to the above aspect, the adhesive layer may be formed such that a thickness between the main body first wall portion and the reinforcing first wall portion is 0.1 mm or more and less than 1.0 mm, and a thickness between the main body side wall portion and the reinforcing side wall portion at the reinforcing side end portion is 1.0 mm or more.

In the vehicle frame structure according to the above aspect, the thickness of the adhesive first wall portion is set to be 0.1 mm or more. Therefore, in the vehicle frame structure according to the above aspect, a high adhesive strength between the main body first wall portion and the reinforcing first wall portion can be secured even when considering manufacturing errors such as uneven application of the adhesive at the time of manufacturing the frame.

In the vehicle frame structure according to the above aspect, the thickness of the adhesive first wall portion is set to be less than 1.0 mm. Therefore, in the vehicle frame structure according to the above aspect, even when a bending moment acts on the frame structure as a compressive load is input to the main body first wall portion, it is advantageous in securing a high adhesive strength in the shearing mode as compared with a case where the thickness of the adhesive first wall portion is made to be 1.0 mm or more.

Furthermore, in the vehicle frame structure according to the above aspect, the thickness of the adhesive side end portion is set to be 1.0 mm or more. Therefore, in the vehicle frame structure according to the above aspect, even when a compressive load is input to the main body first wall portion, a high adhesive strength can be secured between the main body member and the reinforcing member at the reinforcing side end portion. Therefore, when the thickness of the adhesive side end portion is 1.0 mm or more, it is advantageous in securing a high peeling strength at the adhesive side end portion as compared with a case where the thickness of the adhesive side end portion is reduced to less than 1.0 mm.

The vehicle frame structure according to the above aspect may further include an electrodeposition film that is formed by electrodeposition coating and formed so as to coat the main body member, the reinforcing member, and an exposed part of the adhesive layer.

Since the vehicle frame structure according to the above aspect further includes the electrodeposition film, even if a metal member is used for at least one of the main body member and the reinforcing member, it is advantageous in suppressing occurrence of crevice corrosion in a periphery of the reinforcing side end portion.

In the vehicle frame structure according to the above aspect, the main body member may be made of a metal material, and the reinforcing member may be made of a resin material.

In the vehicle frame structure according to the above aspect, the reinforcing member is made of a resin material. Therefore, in the vehicle frame structure according to the above aspect, the reinforcing member is lighter and easier to manufacture than a case where the reinforcing member is made of a metal material. Therefore, in the vehicle frame structure according to the above aspect, it is more advantageous in reinforcing the main body member made of a metal material with the reinforcing member without hindering weight reduction.

In the vehicle frame structure according to the above aspect, the resin material forming the reinforcing member may be a fiber-reinforced resin material.

In the vehicle frame structure according to the above aspect, a reinforcing member made of a fiber-reinforced resin material is adopted. Therefore, in the vehicle frame structure according to the above aspect, it is advantageous in reinforcing the main body member with a reinforcing member having a high strength.

The vehicle frame structure according to the above aspect may further include a bottom wall member disposed to face the main body first wall portion in the cross section, joined at each end of the two main body side wall portions, and extending in the first direction together with the main body member and the reinforcing member.

The vehicle frame structure according to the above aspect further includes the bottom wall member. Therefore, in the vehicle frame structure according to the above aspect, it is possible to realize an internal closed cross-sectional structure in which the cross section is closed by the main body member and the bottom wall member. Therefore, it is further advantageous in securing a high strength of the frame when a compressive load is input.

The vehicle frame structure according to the above aspect may further include an outer wall member disposed so as to cover an outside of the main body member and the reinforcing member in the cross section, joined to the bottom wall member, and extending in the first direction together with the main body member, the reinforcing member, and the bottom wall member.

The vehicle frame structure according to the above aspect further includes the outer wall member, so that a compressive load input to the main body member can be reduced by the outer wall member. In addition, the outer wall member can suppress direct adhesion of moisture to the main body member and the reinforcing member, which is further advantageous for suppressing crevice corrosion.

As described in the foregoing, in the vehicle frame structure according to each of the above aspects, it is possible to improve strength and rigidity without hindering weight reduction, and to suppress occurrence of crevice corrosion.

This application is based on Japanese Patent application No. 2023-078567 filed in Japan Patent Office on May 11, 2023, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A vehicle frame structure comprising:

an elongated main body member;

a reinforcing member that is an elongated member extending along the main body member in a first direction in which the main body member extends, and that is made of a material different from a material of the main body member; and an adhesive layer made of an adhesive that joins the main body member and the reinforcing member to each other, wherein in a cross sectional plane orthogonal to the first direction, the main body member includes a main body first wall portion extending in a second direction, and two main body side wall portions that are continuous with the main body first wall portion at opposite ends of the main body first wall portion, respectively, and extend in a third direction and a fourth direction intersecting the second direction, in the cross sectional plane, the reinforcing member includes a reinforcing first wall portion extending in the second direction along the main body first wall portion, and two reinforcing side wall portions that are continuous with the reinforcing first wall portion at opposite ends of the reinforcing first wall portion, respectively, and extend in the third direction and the fourth direction intersecting the second direction along the main body side wall portions, the main body first wall portion being a wall portion to which a compressive load is input in a direction intersecting both the first direction and the second direction, each of the two reinforcing side wall portions includes a reinforcing side end portion at a distal end thereof spaced from the reinforcing first wall portion, the adhesive layer is formed such that a thickness between the main body side wall portion and the reinforcing side wall portion at the reinforcing side end portion is larger than a thickness between the main body first wall portion and the reinforcing first wall portion, and in the cross sectional plane, each of the two main body side wall portions has, at a middle part in an extending direction, one or more bent portions that protrude toward the other of the two main body side wall portions.

2. The vehicle frame structure according to claim 1, wherein in the cross sectional plane, each of the two reinforcing side wall portions has a first bent portion formed so as to be bent along one of the bent portions of the main body side wall portion.

3. The vehicle frame structure according to claim 2, wherein in the cross section, each of the two reinforcing side wall portions has, at a part closer to the reinforcing side end portion than the first bent portion, a second bent portion that is bent away from the main body side wall portion.

4. The vehicle frame structure according to claim 3, wherein the adhesive layer is formed such that a thickness between the main body first wall portion and the reinforcing first wall portion is 0.1 mm or more and less than 1.0 mm, and a thickness between the main body side wall portion and the reinforcing side wall portion at the reinforcing side end portion is 1.0 mm or more.

5. The vehicle frame structure according to claim 3, further comprising:

an electrodeposition film that is formed by electrodeposition coating and formed so as to coat the main body member, the reinforcing member, and an exposed part of the adhesive layer.

6. The vehicle frame structure according to claim 3, wherein the main body member is made of a metal material, and the reinforcing member is made of a resin material.

7. The vehicle frame structure according to claim 6, wherein the resin material forming the reinforcing member is a fiber-reinforced resin material.

8. The vehicle frame structure according to claim 3, further comprising:

a bottom wall member disposed to face the main body first wall portion in the cross sectional plane, joined at each end of the two main body side wall portions, and extending in the first direction together with the main body member and the reinforcing member.

9. The vehicle frame structure according to claim 8, further comprising:

an outer wall member disposed so as to cover an outside of the main body member and the reinforcing member in the cross sectional plane, joined to the bottom wall member, and extending in the first direction together with the main body member, the reinforcing member, and the bottom wall member.

10. The vehicle frame structure according to claim 1, wherein the adhesive layer is formed such that a thickness between the main body first wall portion and the reinforcing first wall portion is 0.1 mm or more and less than 1.0 mm, and a thickness between the main body side wall portion and the reinforcing side wall portion at the reinforcing side end portion is 1.0 mm or more.

11. The vehicle frame structure according to claim 1, further comprising:

an electrodeposition film that is formed by electrodeposition coating and formed so as to coat the main body member, the reinforcing member, and an exposed part of the adhesive layer.

12. The vehicle frame structure according to claim 1, wherein the main body member is made of a metal material, and the reinforcing member is made of a resin material.

13. The vehicle frame structure according to claim 1, further comprising:

a bottom wall member disposed to face the main body first wall portion in the cross sectional plane, joined at each end of the two main body side wall portions, and extending in the first direction together with the main body member and the reinforcing member.

* * * * *